United States Patent [19]

Bessho et al.

[11] Patent Number: 5,097,520
[45] Date of Patent: Mar. 17, 1992

[54] METHOD OF OBTAINING OPTIMUM THRESHOLD VALUES

[75] Inventors: Goroh Bessho; Michiyoshi Tachikawa, both of Tokyo, Japan

[73] Assignee: Ricoh Company, Ltd., Japan

[21] Appl. No.: 457,933

[22] Filed: Dec. 27, 1989

[30] Foreign Application Priority Data

Jan. 20, 1989 [JP] Japan ............ 1-11478
Jun. 30, 1989 [JP] Japan ............ 1-169034

[51] Int. Cl.$^5$ .............................. G06K 9/36
[52] U.S. Cl. ........................ 382/51; 382/50; 358/466
[58] Field of Search ............ 382/50, 51, 18; 358/466; 341/97

[56] References Cited

U.S. PATENT DOCUMENTS

| | | | |
|---|---|---|---|
| 3,466,603 | 9/1969 | Shelton | 382/51 |
| 3,665,326 | 5/1972 | Sullivan | 382/51 |
| 4,430,748 | 2/1984 | Tuhro et al. | 382/50 |
| 4,675,909 | 6/1987 | Egami et al. | 382/51 |
| 4,747,149 | 5/1988 | Umeda et al. | 382/51 |

*Primary Examiner*—Leo H. Boudreau
*Assistant Examiner*—David Fox
*Attorney, Agent, or Firm*—Mason, Fenwick & Lawrence

[57] ABSTRACT

A binarization method obtains an optimum threshold value for binarization which is used when converting a multi-level image data which describes an input image into a black-and-white bi-level image data. The binarization method includes the steps of counting a first number of black picture elements by varying a threshold value from a darkest tone level to a lightest tone level, counting a second number of picture elements having a tone level other than the lightest tone level, obtaining a percentage of the first number with respect to the second number for each of the varied threshold values so as to normalize a density of the input image, and determining the optimum threshold value for binarization based on the percentage which is obtained for each of the varied threshold values.

18 Claims, 30 Drawing Sheets

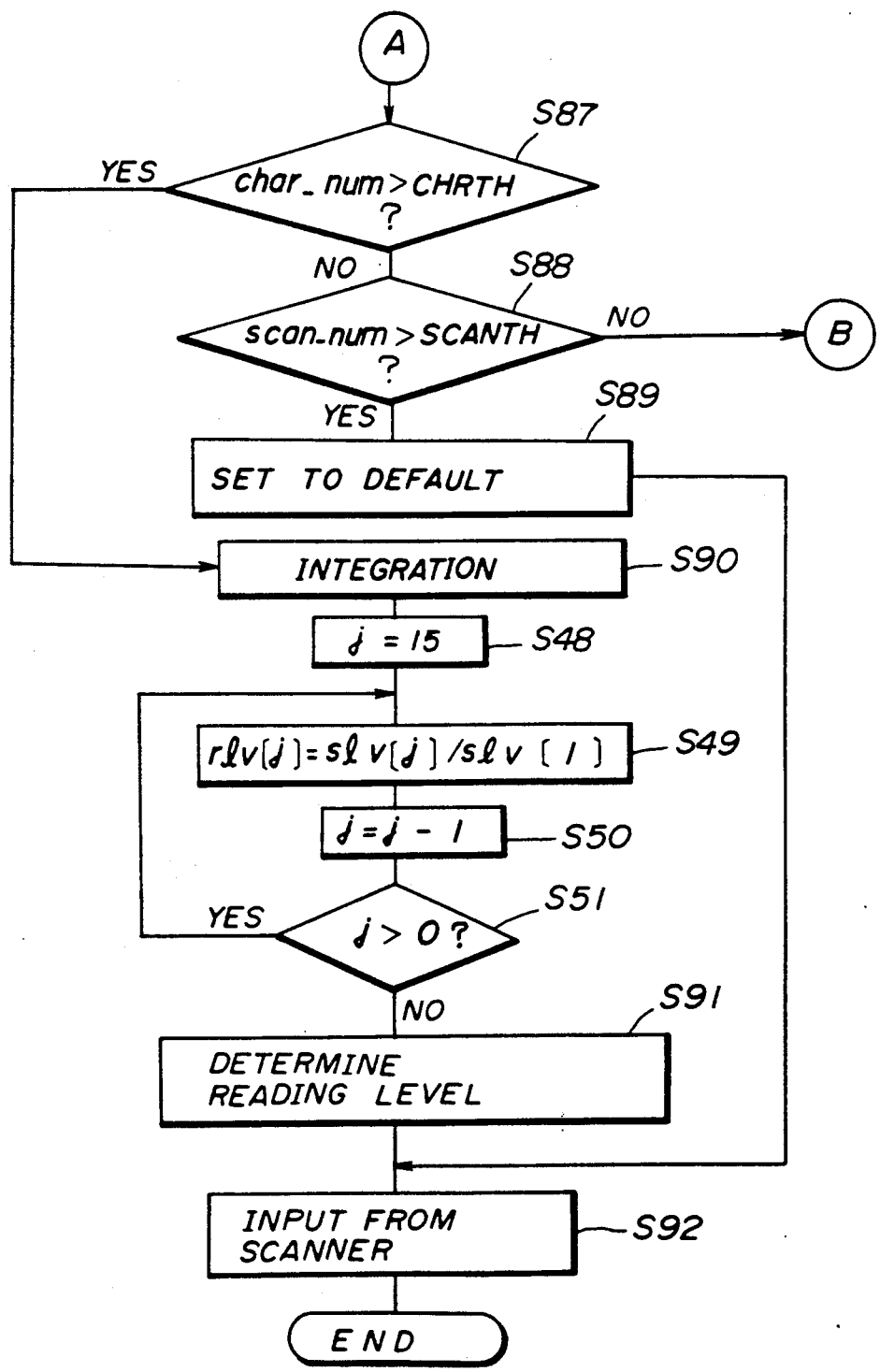

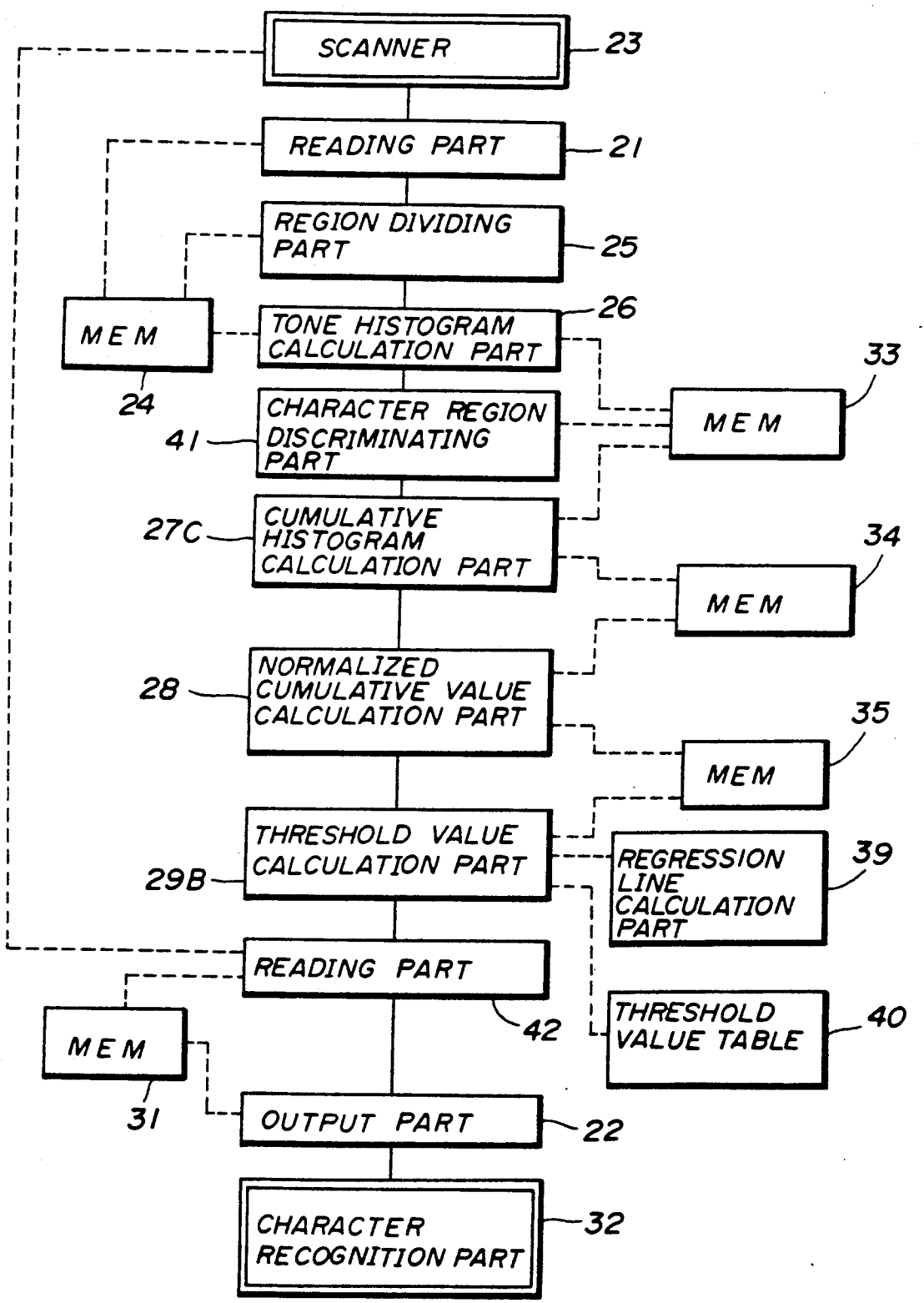

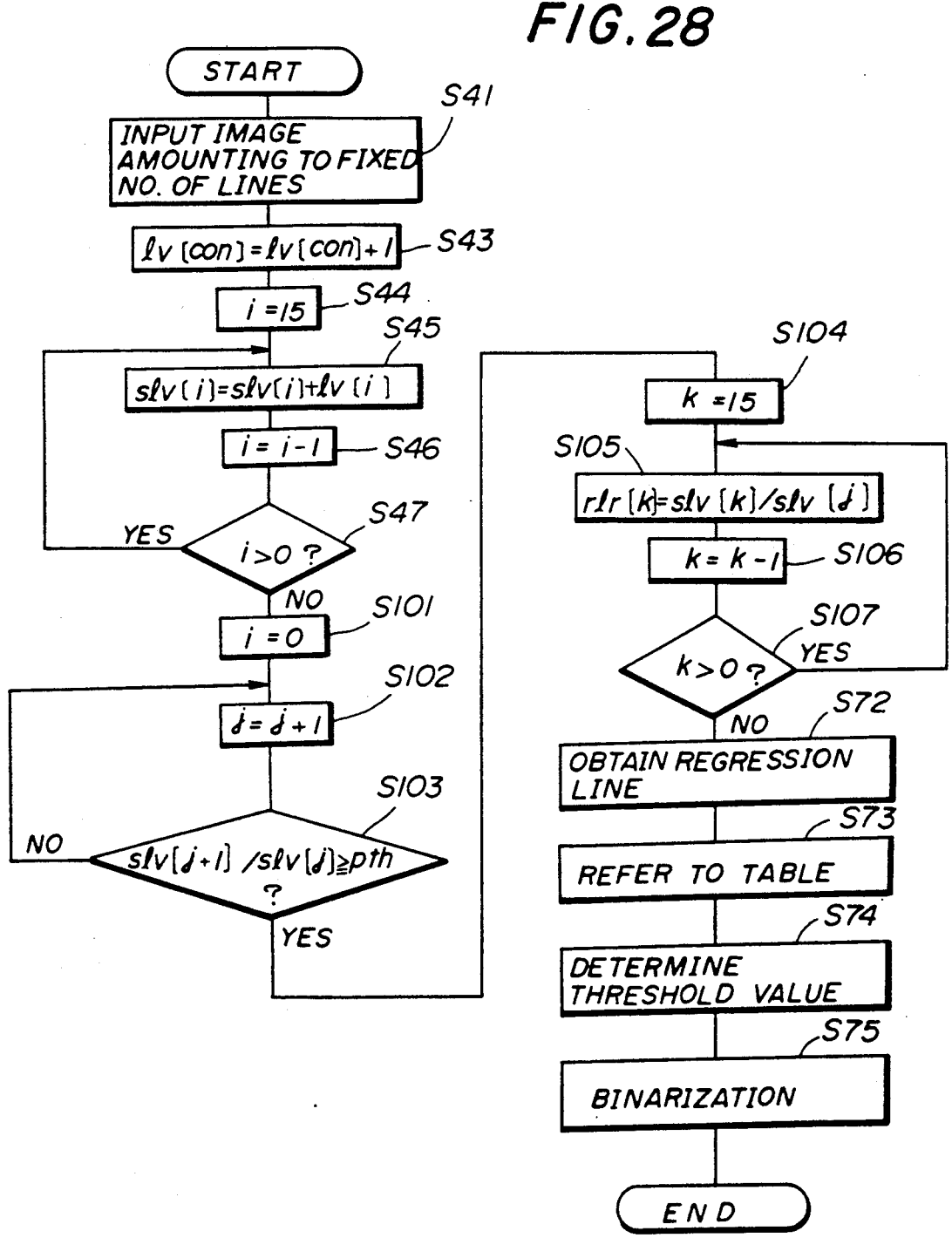

METHOD OF OBTAINING OPTIMUM THRESHOLD VALUES

BACKGROUND OF THE INVENTION

The present invention generally relates to binarization methods, and more particularly to a binarization method which is suited for use in pattern recognition apparatuses such as a character recognition apparatus.

Generally, an image data which is processed on a pattern recognition apparatus such as a character recognition apparatus is obtained for example by subjecting an output of a charge coupled device (CCD) of a scanner to a binarization using a threshold value. In order to make it possible to carry out an optimum binarization even with respect to a document image having a poor printing quality, there is a need to generate an optimum threshold value for the binarization for each of the different tones of the document image.

Various binarization methods have been proposed. For example, the mode method, the differential histogram method and the p-Tile method are explained in H. Tamura, "Introduction to Computer Image Processing", Soken Shuppan (publisher), 1985, pp. 66-68. The mode method obtains a histogram of tones of the given image, and when the histogram has a distribution with two peaks, the threshold value is set to a valley between the two peaks. The differential histogram method determines the threshold value by using a differentiated value of the tone of the image (that is, the rate of change of the tone) instead of directly using the tone of the image, because it can be regarded that a boundary between an object and a background in the image is a portion where the tone suddenly changes. The p-Tile method processes the image with reference to the total area of the image.

On the other hand, N. Ohtsu, "Method of Determining Threshold Value from Tone Distribution", Article No. 145, National Conference of Information Group of the Electronic Communication Society, 1977 proposes a method of determining the threshold value from a tone distribution. This method only uses the zero order and first order moments of the tone distribution and determines the optimum threshold value based on an integration.

Furthermore, an optimum binarization method is proposed in a Japanese Published Patent Application No. 60-37952. According to this system, a multi-level video signal is stored in a video buffer, and a video signal which is read out from the video buffer is binarized by a slicing circuit which has a variable slicing level. The multi-level video signal is sliced at different slicing levels and is converted into a binarized (bi-level) video signal, and a line width amplification is obtained for each of the bi-level video signals. The line width amplification is a ratio is defined as (number of black picture elements)/(number of surrounding picture elements), where the number of black picture elements are the number of black picture elements making up the character and the number of surrounding picture elements are the number of white picture elements surrounding the character. The slicing level of the slicing circuit is set based on the obtained line width amplifications and a reference line width amplification.

However, the mode method cannot be applied to a case where the document image has a poor printing quality because no clear valley exists in the histogram. In addition, the differential histogram method is ineffective with respect to a case where the tone undergoes a complex change in a vicinity of the boundary between the object and the background of the image. Furthermore, an optimum threshold value cannot be obtained according to the p-Tile method depending on the number of characters in the image, the size of each character, the complexity of the character and the like, since the p-Tile method uses the total area of the image as the reference.

The method of determining the threshold value from the tone distribution is not an effective method with respect to a smeared or thinned "line" in the image which is processed during the pattern recognition such as a character recognition.

In addition, it was found from experiments that the optimum binarization method proposed in the Japanese Published Patent Application No. 60-37952 cannot stably obtain the optimum threshold value depending on the tone of the document image.

In actual document images, the tone in many cases change in parts of the document image. For example, this change in the tone occurs when the printing quality of the document image is poor and when a shading is generated in the document image due to characteristics of an input device. According to the conventional methods, it is extremely difficult to generate an optimum bi-level image which can satisfactorily cope with the change in tone which occurs locally in the image.

SUMMARY OF THE INVENTION

Accordingly, it is a general object of the present invention to provide a novel and useful binarization method in which the problems described above are eliminated.

Another and more specific object of the present invention is to provide a binarization method of obtaining an optimum threshold value for binarization which is used when converting a multi-level image data which describes an input image into a black-and-white bi-level image data, comprising the steps of counting a first number of black picture elements by varying a threshold value from a darkest tone level to a lightest tone level, counting a second number of picture elements having a tone level other than the lightest tone level, obtaining a percentage of the first number with respect to the second number for each of the varied threshold values so as to normalize a density of the input image, and determining the optimum threshold value for binarization based on the percentage which is obtained for each of the varied threshold values. According to the binarization method of the present invention, it is possible to automatically set the optimum threshold value for binarization even with respect to a document image which has a poor printing quality, and it is possible to improve the recognition rate when applied to character recognition and the like.

Still another object of the present invention is to provide a binarization method of obtaining an optimum threshold value for binarization which is used when converting a multi-level image data which describes an input image into a black-and-white bi-level image data, comprising the steps of dividing the input image into a plurality of regions, counting a first number of black picture elements within each region by varying a threshold value from a darkest tone level to a lightest tone level, counting a second number of picture elements having a tone level other than the lightest tone level within each region, obtaining a percentage of the first number with respect to the second number for each of the varied threshold values so as to normalize a density of the input image within each region, and determining the optimum threshold value for binarization with respect to each region based on the percentage which is obtained for each of the varied threshold values. According to the binarization method of the present invention, it is possible to obtain an optimum threshold value for binarization in correspondence with a tone change which occurs locally in the document image.

A further object of the present invention is to provide a binarization method of obtaining an optimum threshold value for binarization which is used when converting a multi-level image data which describes an input image into a black-and-white bi-level image data, comprising the steps of dividing the input image into a plurality of regions, discriminating whether or not each region is a character region which constitutes a portion of a character, integrating regions which are discriminated as character regions into an integrated region when a number of regions which are discriminated as the character regions exceeds a predetermined value, counting a first number of black picture elements within the integrated region by varying a threshold value from a darkest tone level to a lightest tone level, counting a second number of picture elements having a tone level other than the lightest tone level within the integrated region, obtaining a percentage of the first number with respect to the second number for each of the varied threshold values so as to normalize a density of the input image within the integrated region, and determining the optimum threshold value for binarization with respect to the integrated region based on the percentage which is obtained for each of the varied threshold values. According to the binarization method of the present invention, it is possible to effectively reduce the data quantity which needs to be processed thus making it possible to carry out the image data processing at a high speed.

Another object of the present invention is to provide a binarization method of obtaining an optimum threshold value for binarization which is used when converting a multi-level image data which describes an input image into a black-and-white bi-level image data, comprising the steps of counting a first number of black picture elements by varying a threshold value from a darkest tone level to a lightest tone level, determining a reference tone level based on a ratio of the first number which is counted with a first threshold value and the first number which is counted with a second threshold value, the first and second threshold values corresponding to two arbitrary successive tone levels, counting a second number of picture elements having a tone level darker than the reference tone level, obtaining a percentage of the first number with respect to the second number for each of the varied threshold values so as to normalize a density of the input image, and determining the optimum threshold value for binarization based on the percentage which is obtained for each of the varied threshold values. According to the binarization method of the present invention, it is possible to obtain an optimum threshold value even with respect to a document image which includes background noise.

Still another object of the present invention is to provide a binarization method of obtaining an optimum threshold value for binarization which is used when converting a multi-level image data which describes an input image into a black-and-white bi-level image data, comprising the steps of dividing the input image into a plurality of regions, counting a first number of black picture elements within each region by varying a threshold value from a darkest tone level to a lightest tone level, determining a reference tone level based on a ratio of the first number which is counted with a first threshold value and the first number which is counted with a second threshold value, the first and second threshold values corresponding to two arbitrary successive tone levels, counting a second number of picture elements having a tone level darker than the reference tone level within each region, obtaining a percentage of the first number with respect to the second number for each of the varied threshold values so as to normalize a density of the input image within each region, and determining the optimum threshold value for binarization with respect to each region based on the percentage which is obtained for each of the varied threshold values.

A further object of the present invention is to provide a binarization method of obtaining an optimum threshold value for binarization which is used when converting a multi-level image data which describes an input image into a black-and-white bi-level image data, comprising the steps of dividing the input image into a plurality of regions, discriminating whether or not each region is a character region which constitutes a portion of a character, integrating regions which are discriminated as character regions into an integrated region when a number of regions which are discriminated as the character regions exceeds a predetermined value, counting a first number of black picture elements within the integrated region by varying a threshold value from a darkest tone level to a lightest tone level, determining a reference tone level based on a ratio of the first number which is counted with a first threshold value and the first number which is counted with a second threshold value, the first and second threshold values corresponding to two arbitrary successive tone levels, counting a second number of picture elements having a tone level darker than the reference tone level within the integrated region, obtaining a percentage of the first number with respect to the second number for each of the varied threshold values so as to normalize a density of the input image within the integrated region, and determining the optimum threshold value for binarization with respect to the integrated region based on the percentage which is obtained for each of the varied threshold values.

Other objects and further features of the present invention will be apparent from the following detailed description when read in conjunction with the accompanying drawings.

BRIEF DESCRIPTION OF THE DRAWINGS

FIGS. 17A and 17B are flow charts showing an operation of the block system shown in FIG. 16 for explaining an operation of the seventh embodiment;

FIG. 21 is a system block diagram showing an image processing system to which a ninth embodiment of the binarization method according to the present invention is applied;

FIG. 28 is a flow chart showing an operation of the block system shown in FIG. 27 for explaining an operation of the twelfth embodiment.

DETAILED DESCRIPTION

Figure 1:
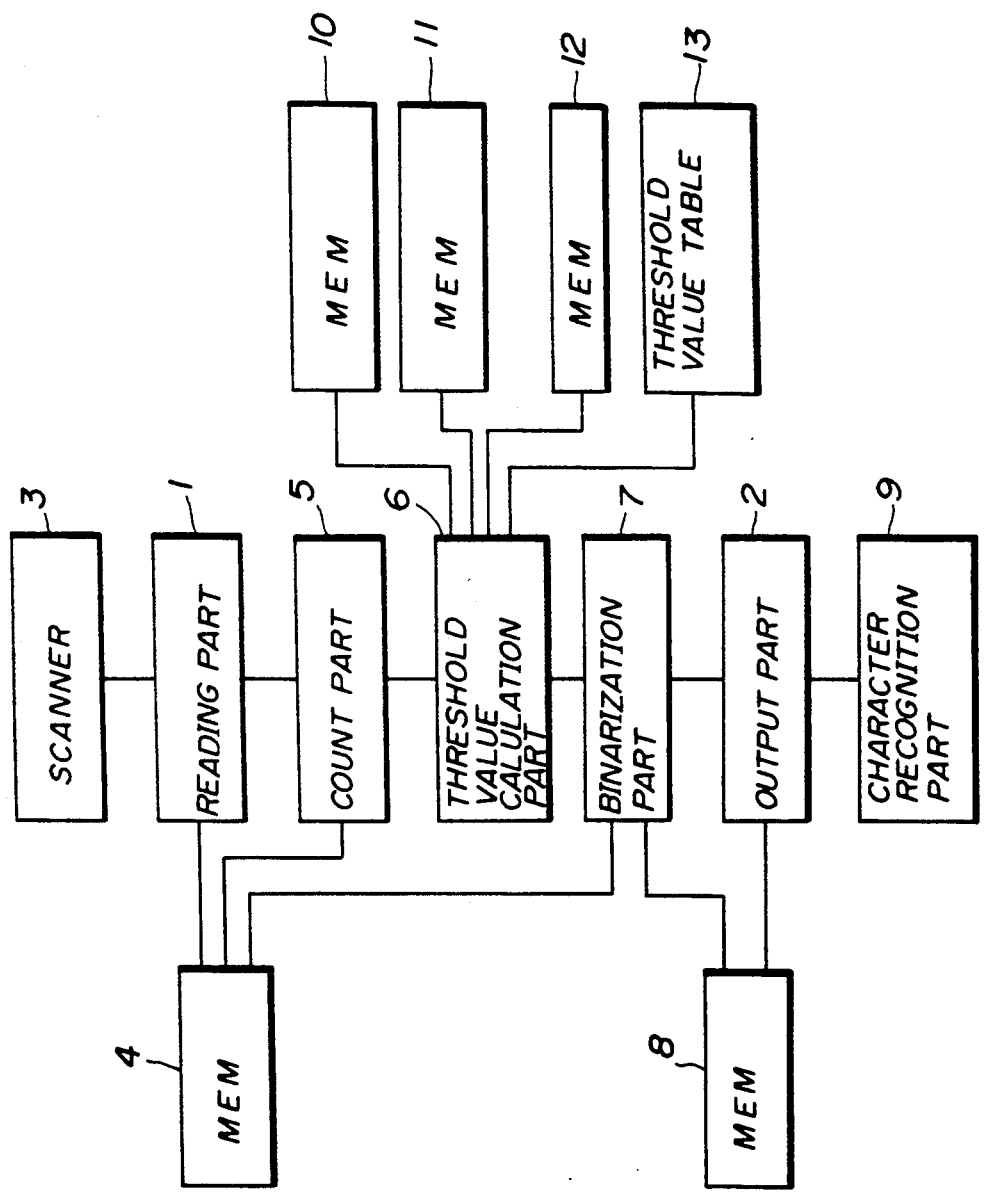
FIG. 1 is a system block diagram showing an image processing system to which a first embodiment of a binarization method according to the present invention is applied.

A description will be given of a first embodiment of the binarization method according to the present invention, by referring to FIGS. 1 and 2. FIG. 1 shows an image processing system to which the first embodiment is applied, and FIG. 2 is a flow chart showing an operation of the block system shown in FIG. 1 for explaining an operation of the first embodiment.

A multi-level image reading part 1 reads a multi-level image data which is obtained from a scanner 3 which scans a document image, and stores the multi-level image data in a multi-level image memory 4. In this embodiment, the multi-level image data has 16 gradation levels "0" through "15" and is obtained by quantizing the image data in 16 quantization levels. A tone histogram count part 5 reads the multi-level image data from the image memory 4 and counts the number of picture elements for each of the tone levels. Based on the tone histogram which is obtained in the count part 5, a threshold value calculation part 6 calculates an optimum threshold value by obtaining a characteristic value indicative of the tone of the document image. A binarization part 7 binarizes the multi-level image data into a bi-level image data based on the optimum threshold value. The bi-level image data is stored in a bi-level image memory 8. On the other hand, the bi-level image data is supplied to a character recognition part 9 and the like via a bi-level image output part 2 for use in making a character recognition and the like.

The operation of the image processing system is characterized by the process which is carried out in the threshold value calculation part 6. A cumulative histogram memory 10, a normalized histogram memory 11, an optimum normalized cumulative value memory 12 and a threshold value table 13 are coupled to the threshold value calculation part 6.

Figure 2:
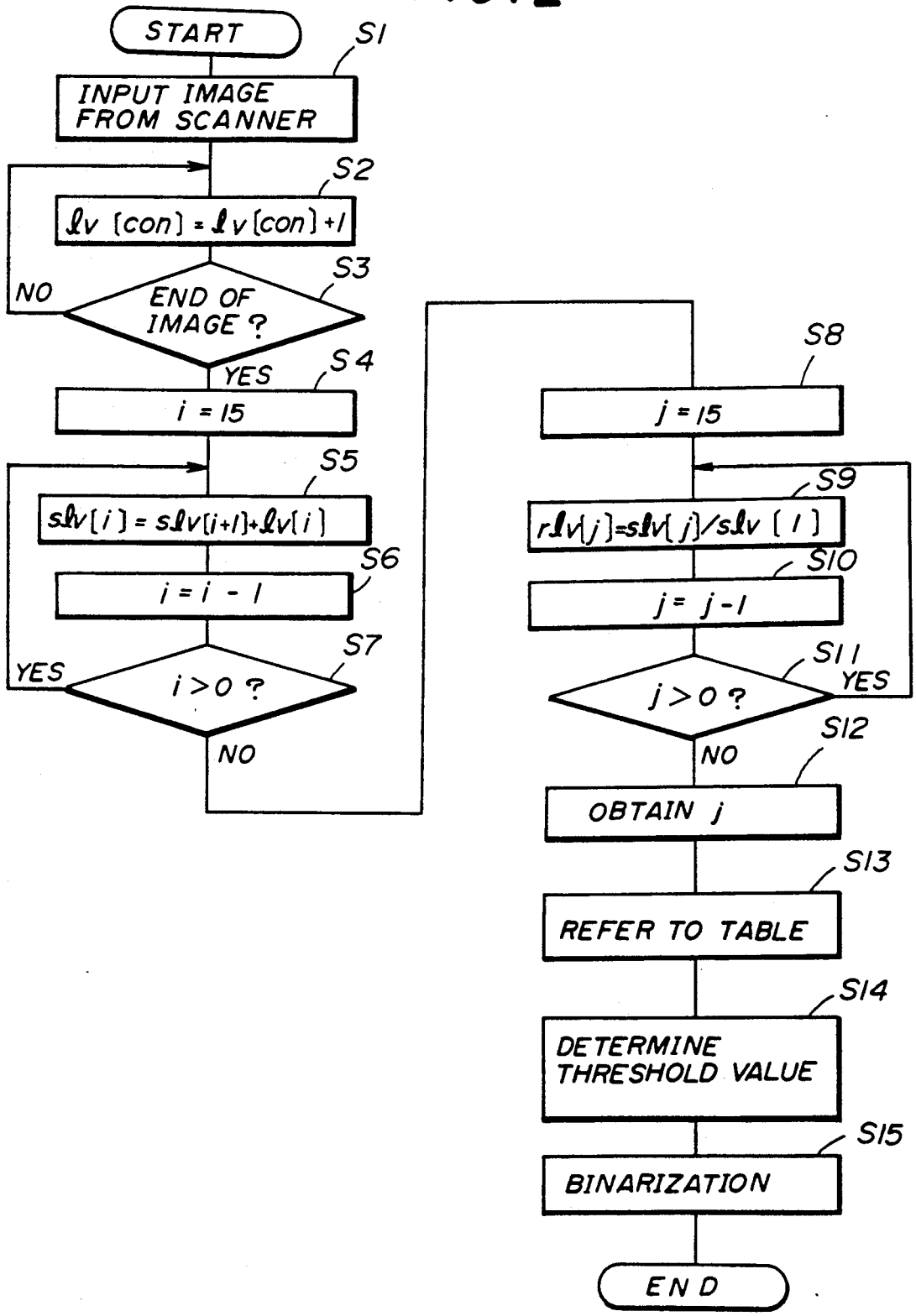
FIG. 2 is a flow chart showing an operation of the block system shown in FIG. 1 for explaining an operation of the first embodiment.

In FIG. 2, a step S1 enters the multi-level image data from the scanner 3, and a step S2 counts the number of picture elements for each of the tone levels of the multi-level image data. Hereunder, the tone level is denoted by "con" and the tone histogram (number of picture elements) is denoted by "lv". A step S3 discriminates whether or not the end of the image is reached. The process returns to the step S2 when the discrimination result in the step S3 is NO, and the process advances to a step S4 when the discrimination result in the step S3 is YES.

Generally, a character image written on a white background has a tone distribution in which the picture elements which are detected as having the lightest tone (tone level "0") make up a large portion of the image, that is, a large portion of the image has no written information and is just the background. Those picture elements which are detected as having the tone levels other than "0" are the picture elements making up the character and the picture elements surrounding the character such as a noise component. In this case, if the conventional method were employed to determine the threshold value by designating the image region to be read and assuming that all of the picture elements within the designated image region are the same, the threshold value would become different depending on the number of picture elements having the tone level "0", that is, depending on whether or not the white region occupies a large portion of the image. As a result, the threshold value will change depending on the size of the white region even when the images have the same tone. But according to this embodiment, the following process is carried out by excluding the picture elements which have the tone level "0" when calculating the threshold value.

The threshold value calculation part 6 inputs the tone histogram and cumulates the number of picture elements which have tone levels greater than "0" for each tone level starting from the darkest (largest) tone level. The step S4 sets a tone level i to i=15. A step S5 sets a cumulative value slv to slv[i]=slv[i+1]+lv[i], and a step S6 decrements i to i=i−1. A step S7 discriminates whether or not i>0, and the process returns to the step S5 when the discrimination result in the step S7 is YES. The process advances to a step S8 when the discrimination result in the step S7 is NO.

In other words, the threshold value calculation part 6 calculates the cumulative value for each of the tone levels and stores the cumulative values in the cumulative histogram memory 10. The cumulative value for one tone level corresponds to the number of black picture elements when this one tone level is taken as the threshold value. The process of calculating the cumulative value for each of the tone levels is carried out from the darkest tone level to the tone level "1". The cumulative value for the tone level "1" corresponds to the number of black picture elements which constitute the character and its surrounding (or noise) with respect to the tone level "0". However, the cumulative value for the tone level "1" also changes depending on the number of characters within the document image, the size of the character, the complexity of the character and the like.

For this reason, the cumulative value for the tone level "1" is taken as a reference and the cumulative values for the other tone levels are normalized with reference to the cumulative value for the tone level "1". The cumulative value for the tone level "1" is assumed to be "100" and the cumulative values for the other tone levels are respectively represented by a percentage with respect to the cumulative value for the tone level "1". In other words, a percentage "rlv[j]" of the cumulative value for a certain tone level j can be calculated from slv[j]/slv[1]. In this specification, this percentage will hereinafter be referred to as a "normalized cumulative value". This normalized cumulative value for a tone level represents a degree of smear (or thinning) of a character with a most smear (or thinning) for the tone level. Hence, the optimum threshold value is determined with reference to the normalized cumulative value for a character which is in an optimum state when the smear and thinning are taken into consideration.

In FIG. 2, the step S8 sets j to j=15, and a step S9 calculates rlv[j]=slv[j]/slv[1]. A step S10 decrements j to j=j−1, and a step S11 discriminates whether or not j>0. The process returns to the step S9 when the discrimination result in the step S11 is YES. On the other hand, the process advances to a step S12 when the discrimination result in the step S11 is NO.

A description will be given of a first method of determining the optimum threshold value. The normalized cumulative value in the optimum state when the smear and thinning are taken into consideration is obtained by actually recognizing a number of document images to obtain the optimum threshold value and then making a reverse operation on the optimum threshold value. In other words, the normalized cumulative value for each tone level is compared with an optimum normalized cumulative value which is obtained beforehand and stored in the optimum normalized cumulative value memory 12 shown in FIG. 1, and the tone level at which the difference between the two compared normalized cumulative values becomes a minimum is considered as the optimum threshold value.

For the sake of convenience, when it is assumed that the optimum normalized cumulative value is 70%, the value at the tone level "5" is closest to 70% in Table 1 and the optimum threshold value is considered as "5". Table 1 shows an examples of the normalized cumulative values for each of the tone levels.

TABLE 1

| Tone Level | Normalized Cumulated Value (%) |
|---|---|
| F | 0.04 |
| E | 0.04 |
| D | 0.06 |
| C | 1.51 |
| B | 5.58 |
| A | 16.07 |
| 9 | 29.63 |
| 8 | 37.18 |
| 7 | 54.73 |
| 6 | 63.30 |
| 5 | 72.86 |
| 4 | 79.54 |
| 3 | 88.12 |
| 2 | 92.70 |
| 1 | 100.00 |
| 0 | — |

Next, a description will be given of a second method of determining the optimum threshold value. Depending on the kind of scanner 3 used, the scanner 3 may output both the multi-level image data and the black-and-white bi-level image data. The first method described above may be employed when binarizing the output multi-level image data of the scanner 3 into the black-and-white bi-level image data. But in the case where the bi-level image data is read after determining the threshold value for the binarization, the first method cannot obtain the optimum threshold value in some cases.

Accordingly, the second method obtains a predetermined tone level at which the normalized cumulative value closest to the optimum normalized cumulative value is obtained, and a tone level which is between this predetermined tone level and the next closest tone level and at which the normalized cumulative value becomes closest to the optimum normalized cumulative value is calculated by making an approximation to the first place of the decimal. From Table 1, the tone level at which the normalized cumulative value is closest to the optimum normalized cumulative value 70% is the tone level "5" which has the normalized cumulative value 72.86%, and the next closest tone level is the tone level "6" which has the normalized cumulative value 63.30%. Hence, the difference between the normalized cumulative values for the two tone levels is divided by 10 to obtain (72.86−63.30)/10=0.956, and this value "0.956" is used to carry out the following calculation so as to obtain the fine tone levels between the tone levels "5" and "6".

| | |
|---|---|
| 63.30+0.956×1=62.256 | Tone Level 5.9 |
| 63.30+0.956×2=62.212 | Tone Level 5.8 |
| 63.30+0.956×7=69.992 | Tone Level 5.3 |
| 63.30+0.956×8=70.948 | Tone Level 5.2 |
| 63.30+0.956×9=71.904 | Tone Level 5.1 |

The tone level at which the normalized cumulative value becomes closest to the optimum normalized cumulative value is selected from the above tone levels which are calculated by making the approximation to the first place of the decimal. In this case, the tone level which has the normalized cumulative value closest to the optimum normalized cumulative value 70% is the tone level "5.3". This tone level "5.3" is used to refer to the threshold value table 13 shown in FIG. 1 to determine the optimum threshold value.

The flow chart shown in FIG. 2 shows the case where the second method of determining the optimum threshold value is employed. The step S12 obtains j such that the difference between the optimum cumulative value stored in the optimum normalized cumulative value memory 12 and rlv[j] becomes a minimum by carrying out a calculation and making an approximation to the first place of the decimal. A step S13 refers to the threshold value table 13 using the obtained j, and a step S14 determines the optimum threshold value. A step S15 binarizes the multi-level image data and the process is ended.

In FIG. 2, the steps S2 and S3 forms the tone histogram. The steps S4 through S7 forms the cumulative histogram, and the steps S8 through S11 forms the normalized histogram.

According to this embodiment, it is possible to automatically set the optimum threshold value for the binarization even when the printing quality of the document image is poor such as a case where a document printed on a wire dot printer.

Figure 3:
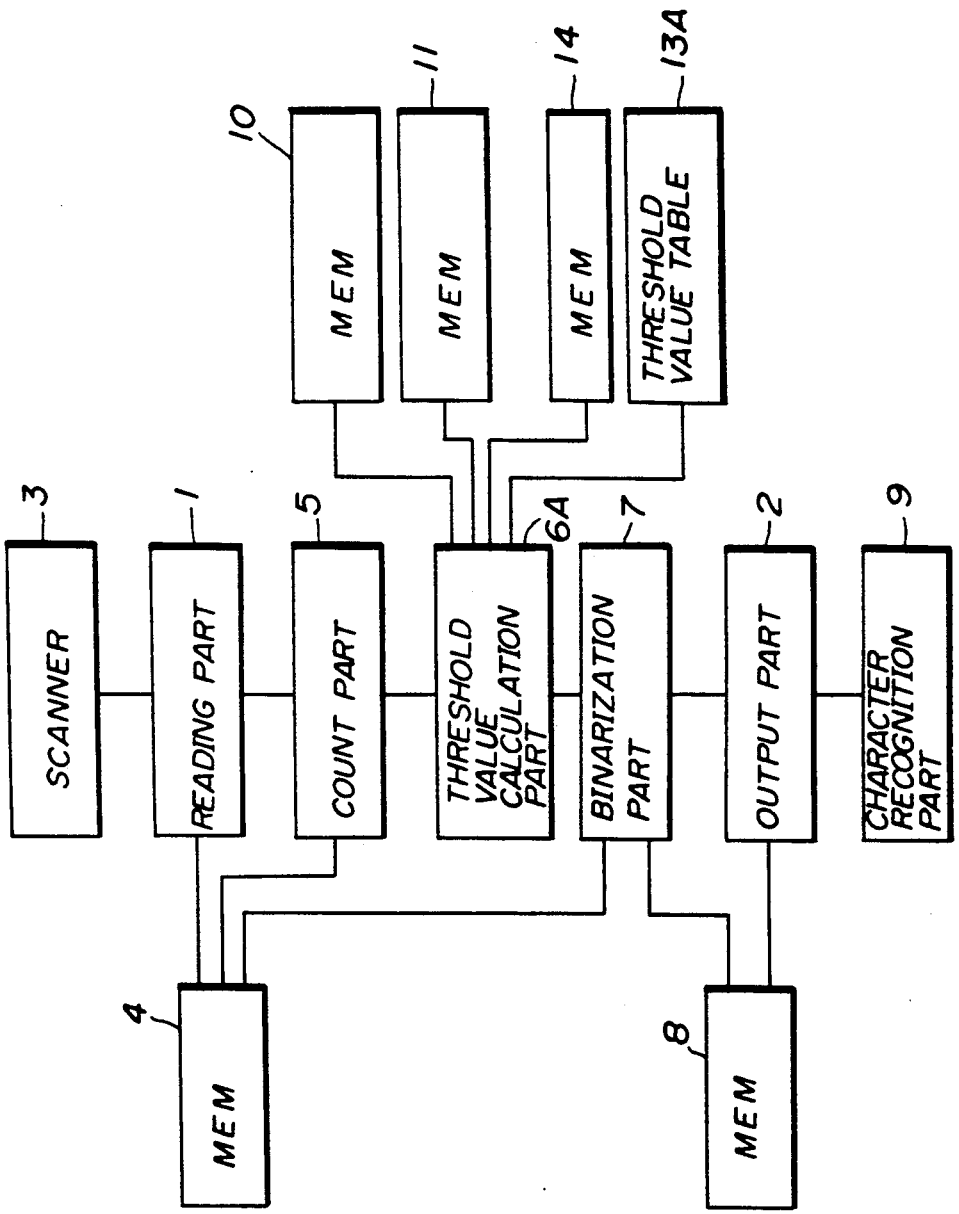
FIG. 3 is a system block diagram showing an image processing system to which a second embodiment of the binarization method according to the present invention is applied.
Figure 4:
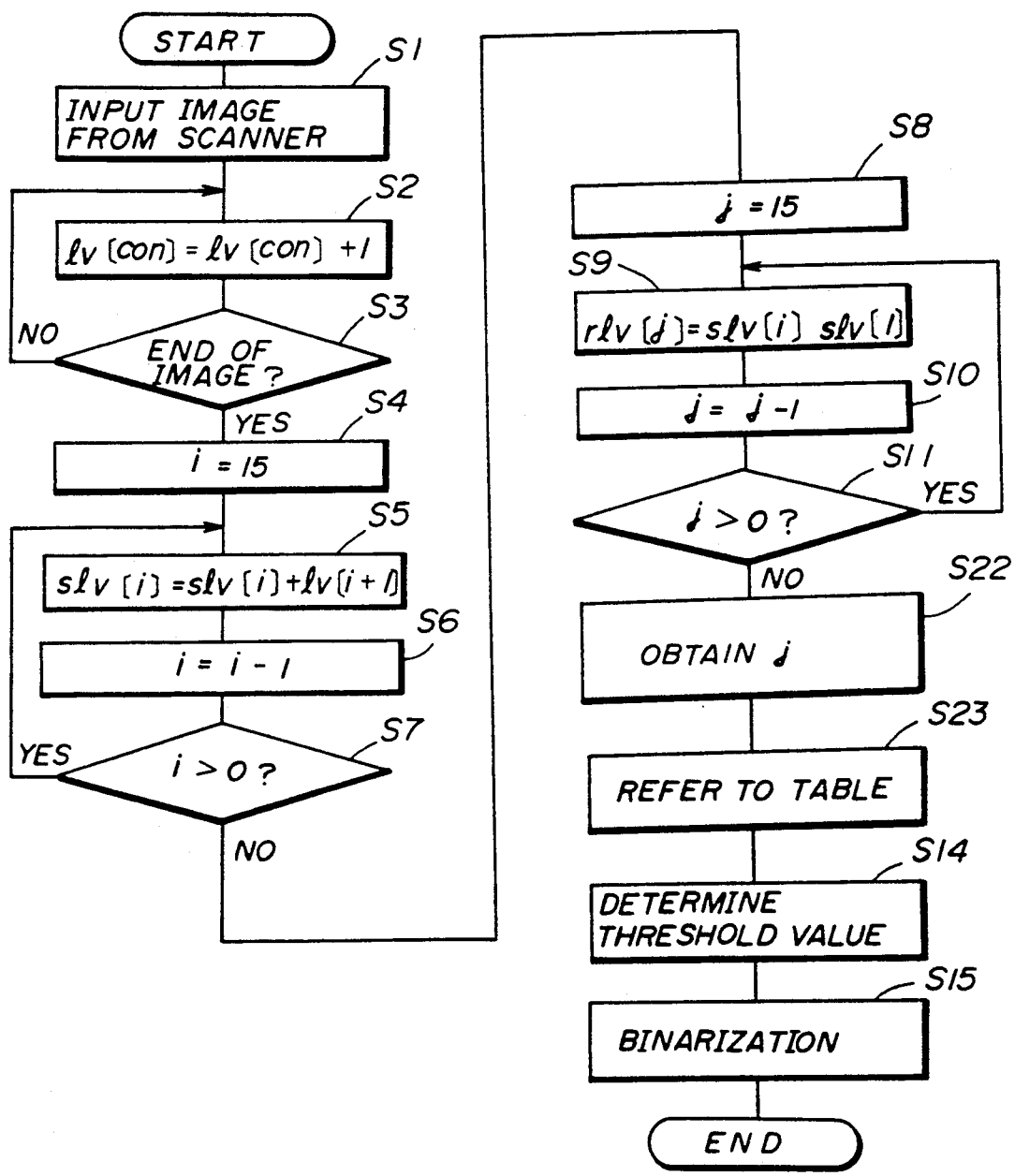
FIG. 4 is a flow chart showing an operation of the block system shown in FIG. 3 for explaining an operation of the second embodiment.

Next, a description will be given of a second embodiment of the binarization method according to the present invention, by referring to FIGS. 3 and 4. FIG. 3 shows an image processing system to which the second embodiment is applied, and FIG. 4 shows a flow chart showing an operation of the block system shown in FIG. 3 for explaining an operation of the second embodiment. In FIGS. 3 and 4, those parts which are essentially the same as those corresponding parts in FIGS. 1 and 2 are designated by the same reference numerals, and a description thereof will be omitted.

In this embodiment, a threshold value calculation part 6A is used in place of the threshold value calculation part 6, and a darkest tone level percentage memory 14 is used in place of the optimum normalized cumulative value memory 12. In addition, a threshold value table 13A is used in place of the threshold value table 13.

The processes of forming the tone histogram, forming the cumulative histogram and forming the normalized histogram are carried out similarly as in the case of the first embodiment. The cumulative value at the tone level "1" is assumed to be 100%, and the cumulative values at each of the tone levels are represented by percentage with respect to the cumulative value at the tone level "1". The normalized cumulative value for a tone level represents a degree of smear (or thinning) of a character with a most smear (or thinning) for the tone level.

In this embodiment, attention is drawn to the tone level at which the normalized cumulative values take a small value, that is, the tone level immediately before the image thins out and disappears, and this tone level is used to determine the threshold value for the binarization. This tone level corresponds to the tone level at which the darkest picture element in the document image starts to appear.

According to a first method of determining the optimum threshold value in this second embodiment, it is assumed for the sake of convenience that the normalized cumulative value in the darkest tone level percentage memory 14 shown in FIG. 3 is set to 5%. The tone level at which the difference between the normalized cumulative value and the normalized cumulative value 5% becomes a minimum is obtained. In Table 1, the tone level "11" at which the normalized cumulative value is "5.58" corresponds to the tone level at which the above difference is a minimum. The relationship between this tone level at which the difference is the minimum and the optimum threshold value of the document image is examined beforehand, and the optimum threshold value is determined from this tone level.

Next, a description will be given of a second method of determining the optimum threshold value in this second embodiment. The flow chart shown in FIG. 4 shows this second method. Depending on the kind of scanner 3 used, the span differs for each tone level. Hence, in order to more accurately obtain the threshold value, a predetermined tone level at which the normalized cumulative value closest to the optimum normalized cumulative value 5% is obtained, and a tone level which is between this predetermined tone level and the next closest tone level and at which the normalized cumulative value becomes closest to the optimum normalized cumulative value 5% is obtained. A tone level is then calculated from a value which is obtained by dividing the above difference by 10 by making an approximation to the first place of the decimal. From Table 1, the tone level at which the normalized cumulative value is closest to the optimum normalized cumulative value 5% is the tone level "11" which has the normalized cumulative value 5.58%, and the next closest tone level is the tone level "12" which has the normalized cumulative value 1.51%. Hence, the difference between the normalized cumulative values for the two tone levels is divided by 10 to obtain (5.58−1.51)/10=0.407, and this value "0.407" is used to carry out the following calculation so as to obtain the fine tone levels between the tone levels "11" and "12".

| | |
|---|---|
| 1.51+0.407×1=1.197 | Tone Level 11.9 |
| 1.51+0.407×2=2.324 | Tone Level 11.8 |
| 1.51+0.407×8=4.766 | Tone Level 11.2 |

$1.51 + 0.407 \times 9 = 5.173$ Tone Level 11.1

The tone level at which the normalized cumulative value becomes closest to the optimum normalized cumulative value 5% is selected from the above tone levels which are calculated by making the approximation to the first place of the decimal. In this case, the tone level which has the normalized cumulative value closest to the optimum normalized cumulative value 5% is the tone level "11.1". This tone level "11.1" is used to refer to the threshold value table 13A shown in FIG. 3 to determine the optimum threshold value.

In the flow chart shown in FIG. 4, a step S22 obtains j such that the difference between the percentage of the darkest tone level and rlv[j] becomes a minimum by carrying out a calculation and making an approximation to the first place of the decimal. In addition, a step S23 refers to the threshold value table 13A.

According to this embodiment, it is also possible to automatically set the optimum threshold value for the binarization even when the printing quality of the document image is poor such as a case where a document printed on a wire dot printer, and it is possible to realize an excellent recognition rate of the image.

Figure 5:
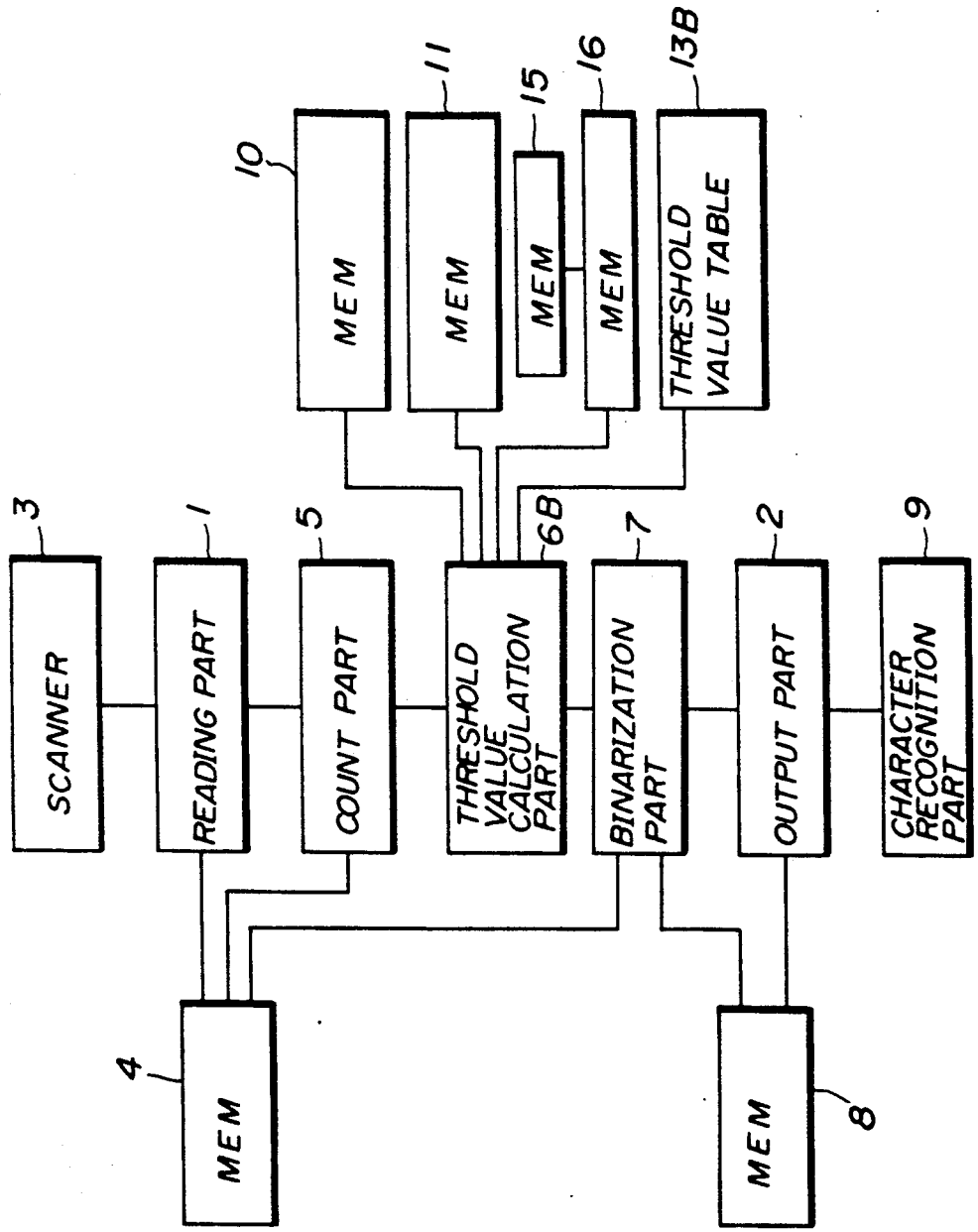
FIG. 5 is a system block diagram showing an image processing system to which a third embodiment of the binarization method according to the present invention is applied.
Figure 6:
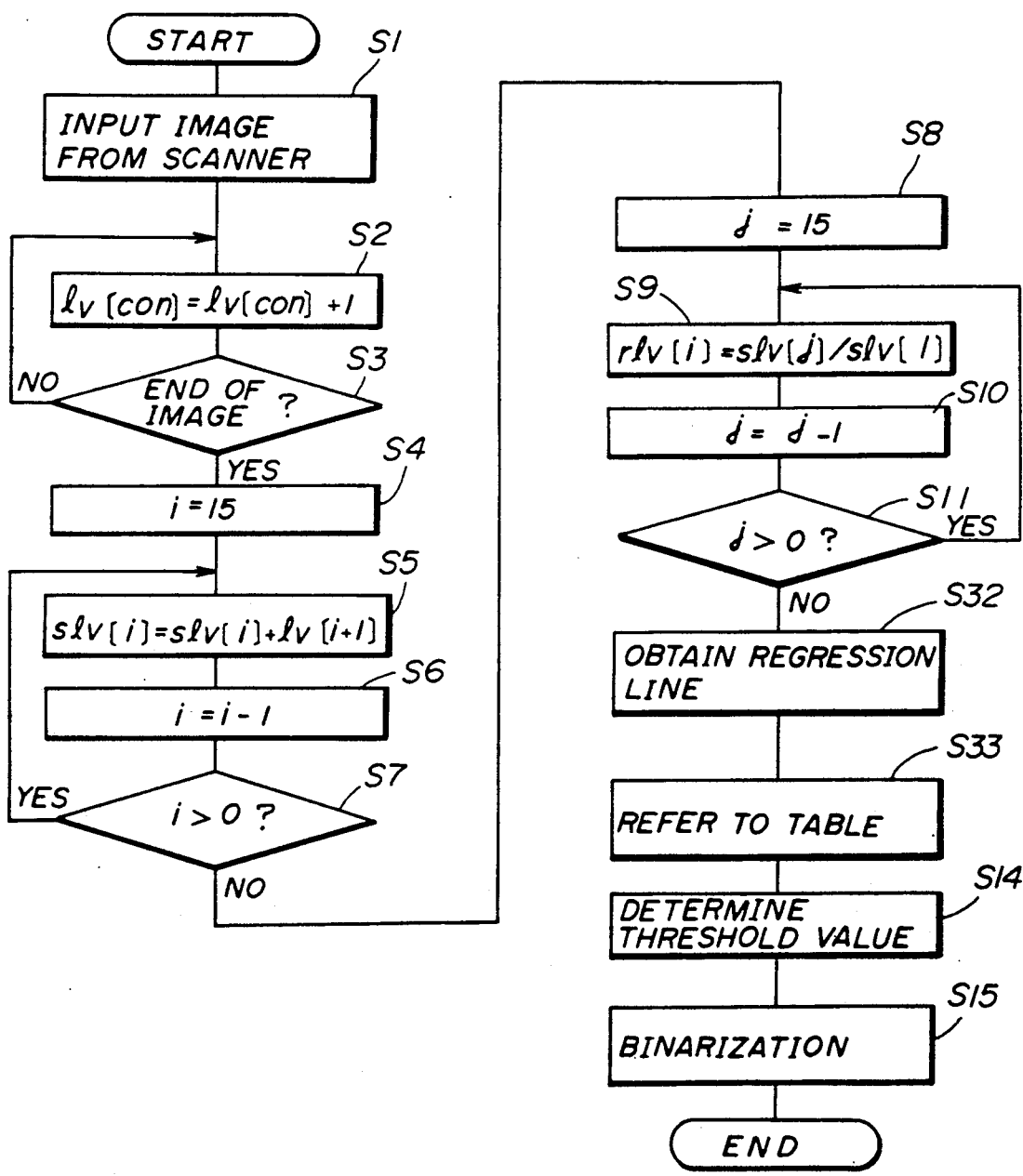
FIG. 6 is a flow chart showing an operation of the block system shown in FIG. 5 for explaining an operation of the third embodiment.

Next, a description will be given of a third embodiment of the binarization method according to the present invention, by referring to FIGS. 5 through 8. FIG. 5 shows an image processing system to which the third embodiment is applied, and FIG. 6 shows a flow chart showing an operation of the block system shown in FIG. 5 for explaining an operation of the third embodiment. In FIGS. 5 and 6, those parts which are essentially the same as those corresponding parts in FIGS. 1 and 2 are designated by the same reference numerals, and a description thereof will be omitted.

In this embodiment, a threshold value calculation part 6B is used in place of the threshold value calculation part 6, and a regression line memory 16 which is provided with a linear level memory 15 is used in place of the optimum normalized cumulative value memory 12. In addition, a threshold value table 13B is used in place of the threshold value table 13.

The processes of forming the tone histogram, forming the cumulative histogram and forming the normalized histogram are carried out similarly as in the case of the first embodiment. The cumulative value at the tone level "1" is assumed to be 100%, and the cumulative values at each of the tone levels are represented by percentage with respect to the cumulative value at the tone level "1". The normalized cumulative value for a tone level represents a degree of smear (or thinning) of a character with a most smear (or thinning) for the tone level.

Figure 7:
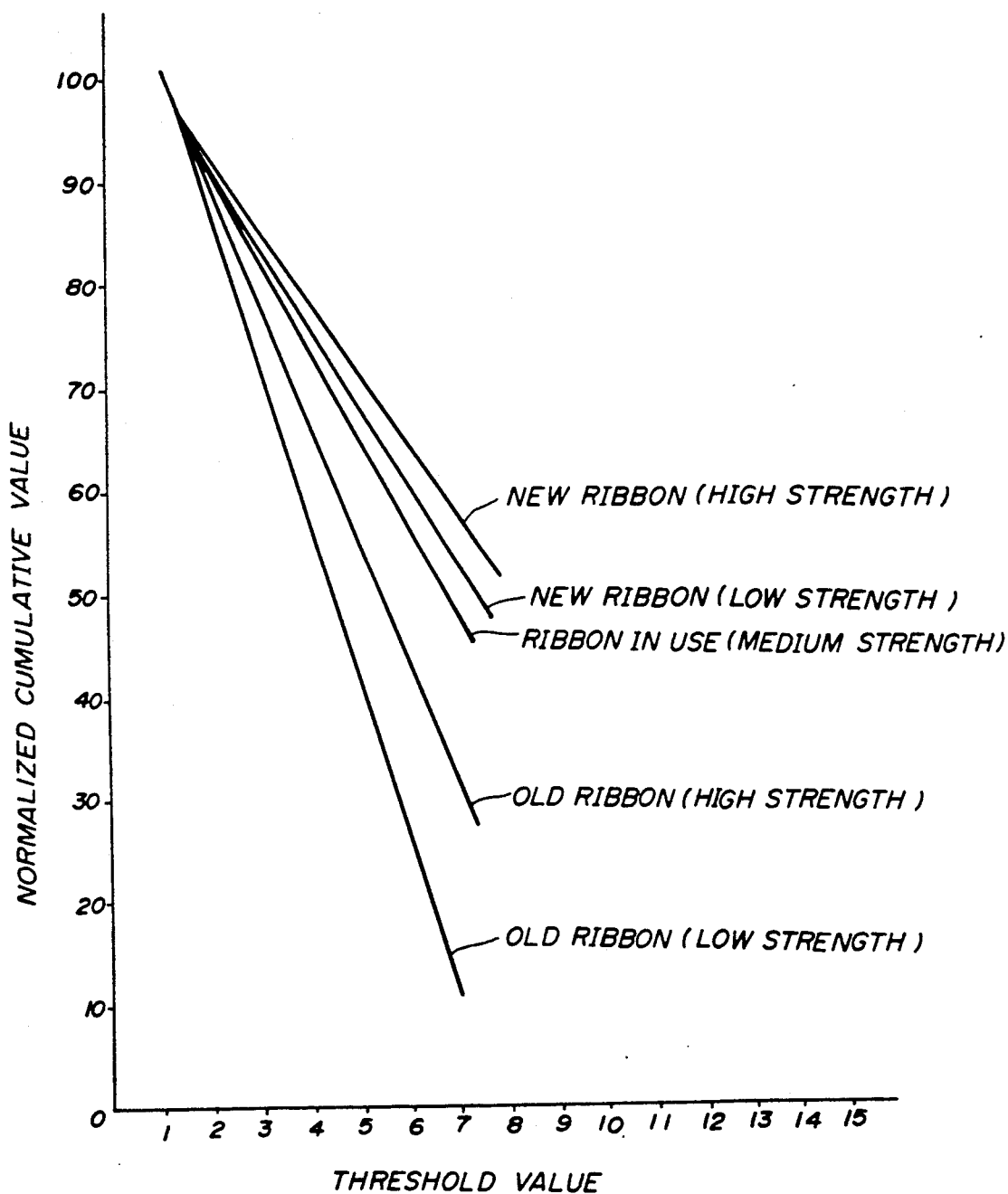
FIG. 7 shows a relationship between a threshold value and a normalized cumulative value.

When the relationship between the normalized cumulative value and the tone level is examined, it is found that the relationship is linear for certain tone levels. When the linear portion of the relationship is extracted and the regression line is obtained by applying the method of least squares, the inclination of the regression line, that is, the rate of change, differs depending on the tone of the document image as shown in FIG. 7. In other words the inclination of the regression line is steep for light document images and the inclination becomes more gradual as the tone of the document image becomes darker. By utilizing this relationship, it is possible to represent the tone characteristic of the document image.

Figure 8:
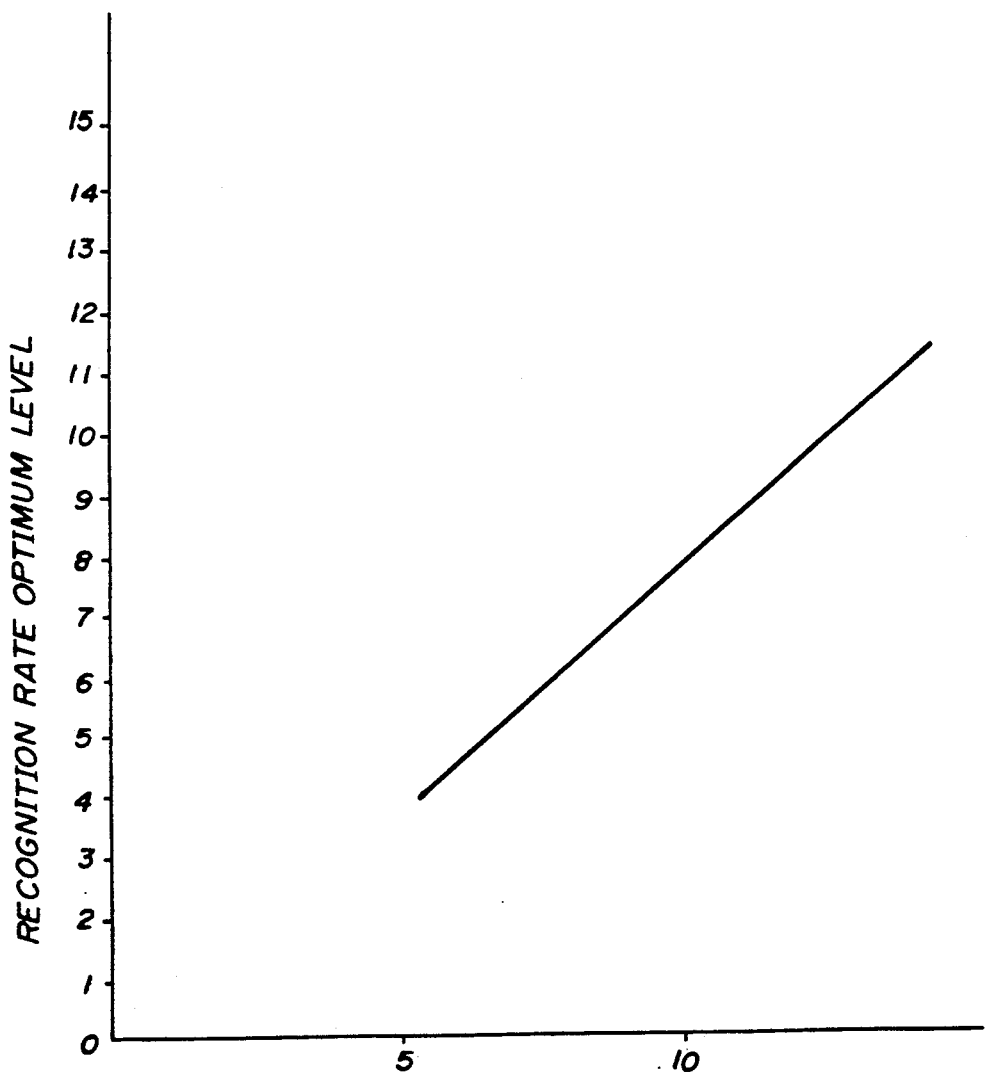
FIG. 8 shows a relationship between an inclination of a regression line and an optimum tone level.

Accordingly, in this third embodiment, a relationship between the optimum threshold values of document images and the inclination angles of regression lines as shown in FIG. 8 is examined beforehand, and this relationship is registered in the form of a table in the threshold value table 13B. The tone levels at which the linear relationship holds differ depending on the characteristic of the scanner 3 used. By utilizing the linearity which is observed between the obtained normalized cumulative value and the tone level, the regression line is calculated. The regression line memory 16 which has the linear level memory 15 is provided to carry out this calculation. The inclination of the calculated regression line is used to make reference to the threshold value table 13B so as to obtain the optimum threshold value.

In the flow chart shown in FIG. 6, a step S32 obtains the regression line of the relationship between the normalized cumulative value and the tone level. In addition, a step S33 refers to the threshold value table 13B.

Figure 9:
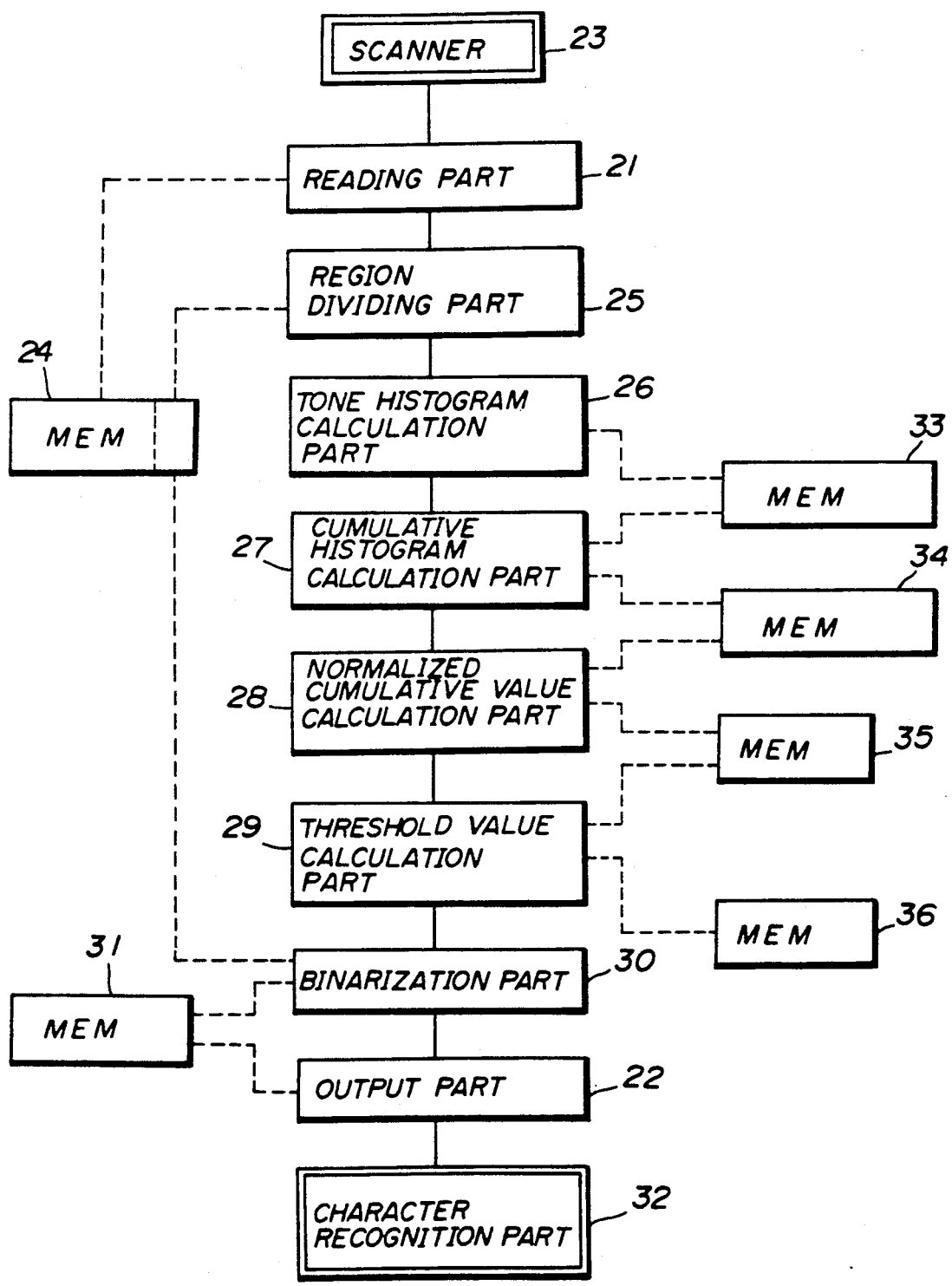
FIG. 9 is a system block diagram showing an image processing system to which a-fourth embodiment of the binarization method according to the present invention is applied.
Figure 10:
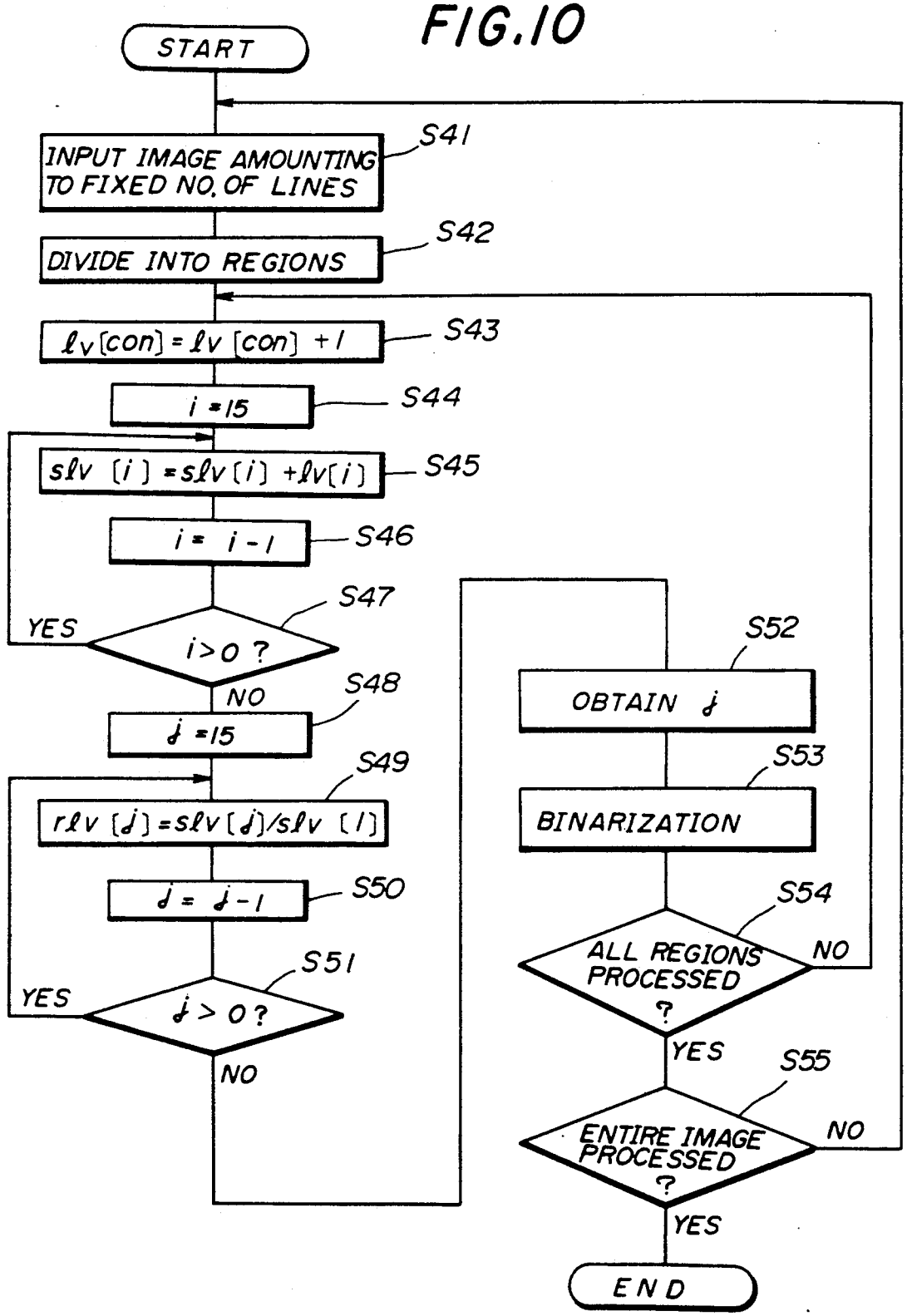
FIG. 10 is a flow chart showing an operation of the block system shown in FIG. 9 for explaining an operation of the fourth embodiment.

Next, a description will be given of a fourth embodiment of the binarization method according to the present invention, by referring to FIGS. 9 through 11. FIG. 9 shows an image processing system to which the fourth embodiment is applied, and FIG. 10 shows a flow chart showing an operation of the block system shown in FIG. 9 for explaining an operation of the fourth embodiment.

In FIG. 9, a multi-level image reading part 21 reads a predetermined fixed number of lines from a multi-level image data which is received from a scanner 23 and stores the lines in a multi-level image memory 24. An image described by the multi-level image data amounting to this predetermined fixed number of lines is divided into fixed small regions in a region dividing part 25. A tone histogram count part 26 counts the number of picture elements for each of the tone levels with respect to one divided small region of the document image. A cumulative histogram calculation part 27 cumulates the number of picture elements from the picture elements having the dark tone, and a normalized cumulative value calculation part 28 obtains a percentage of the normalized density of the document image. A threshold value calculation part 29 calculates an optimum threshold value from the normalized cumulative value which is obtained and a reference normalized cumulative value which is obtained from a reference normalized cumulative value memory 36. A binarization part 30 binarizes the multi-level image data into a bi-level image data and stores this bi-level image data in a bi-level image memory 30. Thereafter, the above described process including the binarization is carried out similarly with respect to a next divided small region.

When the binarization is ended with respect to all of the divided small regions of the multi-level image data amounting to the predetermined fixed number of lines, the multi-level image reading part 21 reads a next predetermined fixed number of lines of the multi-level image data so as to carry out a similar process on this next predetermined fixed number of lines. When the process is completed with respect to the entire document image, an optimum bi-level image data is produced. A bi-level image output part 22 supplies this bi-level image data to a character recognition part 32 for use in making a character recognition and the like.

A tone histogram memory 33 is coupled to the tone histogram calculation part 26 and the cumulative histogram calculation part 27. A cumulative histogram memory 34 is coupled to the cumulative histogram calculation part 27 and the normalized cumulative value calculation part 28. A normalized cumulative value memory 35 is coupled to the normalized cumulative value calculation part 28 and the threshold value calculation part 29. In addition, the reference normalized cumulative value memory 36 is coupled to the threshold value calculation part 29.

In FIG. 10, a step S41 enters the multi-level image data from the scanner 3 amounting to the predetermined fixed number of lines and stores the lines in the multi-level image memory 24. A step S42 divides the image portion which is described by the line stored in the multi-level image memory 24 into fixed small regions in the region dividing part 25. A step S43 counts the number of picture elements for each of the tone levels of the multi-level image data related to one divided region and stores the numbers in the tone histogram memory 33. The tone level is denoted by "con" and the tone histogram (number of picture elements) is denoted by "lv".

Generally, a character image written on a white background has a tone distribution in which the picture elements which are detected as having the lightest tone (tone level "0") make up a large portion of the image, that is, a large portion of the image has no written information and is just the background. Those picture elements which are detected as having the tone levels other than "0" are the picture elements making up the character and the picture elements surrounding the character such as a noise component. In this case, if the conventional method were employed to determine the threshold value by designating the image region to be read and assuming that all of the picture elements within the designated image region are the same, the threshold value would become different depending on the number of picture elements having the tone level "0", that is, depending on whether or not the white region occupies a large portion of the image. As a result, the threshold value will change depending on the size of the white region even when the images have the same tone. But according to this embodiment, the following process is carried out by excluding the picture elements which have the tone level "0" when calculating the threshold value.

The cumulative histogram calculation part 27 inputs the tone histogram and cumulates the number of picture elements which have tone levels greater than "0" for each tone level starting from the darkest (largest) tone level. A step S44 sets a tone level i to i=15. A step S45 sets a cumulative value slv to slv[i]=slv[i+1]+lv[i], and a step S46 decrements i to i=i−1. A step S47 discriminates whether or not i>0, and the process returns to the step S45 when the discrimination result in the step S47 is YES. The process advances to a step S48 when the discrimination result in the step S47 is NO.

In other words, the cumulative histogram calculation part 27 calculates the cumulative value for each of the tone levels and stores the cumulative values in the cumulative histogram memory 34. The cumulative value for one tone level corresponds to the number of black picture elements when this one tone level is taken as the threshold value. The process of calculating the cumulative value for each of the tone levels is carried out from the darkest tone level to the tone level "1". The cumulative value for the tone level "1" corresponds to the number of black picture elements which constitute the character and its surrounding (or noise) with respect to the tone level "0". However, the cumulative value for the tone level "1" also changes depending on the number of characters within the document image, the size of the character, the complexity of the character and the like.

For this reason, the cumulative value for the tone level "1" is taken as a reference and the cumulative values for the other tone levels are normalized with reference to the cumulative value for the tone level "1". The cumulative value for the tone level "1" is assumed to be "100" and the cumulative values for the other tone levels are respectively represented by a percentage with respect to the cumulative value for the tone level "1". In other words, a percentage "rlv[j]" of the cumulative value for a certain tone level j can be calculated from slv[j]/slv[1]. This percentage is the "normalized cumulative value". This normalized cumulative value for a tone level represents a degree of smear (or thinning) of a character with a most smear (or thinning) for the tone level. Hence, the optimum threshold value is determined with reference to the normalized cumulative value for a character which is in an optimum state when the smear and thinning are taken into consideration. The normalized cumulative value calculation part 28 reads the cumulative values from the cumulative histogram memory 34 and calculates the normalized cumulative values for each of the darkest tone level to the tone level "1".

In FIG. 10, the step S48 sets j to j=15, and a step S49 calculates rlv[j]=slv[j]/slv[1]. A step S50 decrements j to j=j−1, and a step S51 discriminates whether or not j>0. The process returns to the step S49 when the discrimination result in the step S51 is YES. On the other hand, the process advances to a step S52 when the discrimination result in the step S51 is NO.

Therefore, the step S43 forms the tone histogram, and the steps S44 through S47 forms the cumulative histogram. In addition, the steps S48 through S51 forms the normalized histogram.

The threshold value calculation part 29 reads the normalized cumulative values from the normalized cumulative value memory 35 and determines as the optimum threshold value the tone level at which the normalized cumulative value is closest to the reference normalized cumulative value which is obtained beforehand and stored in the reference normalized cumulative value memory 36. The reference normalized cumulative value is the optimum normalized cumulative value for a character which is in an optimum state when the smear and thinning are considered, and corresponds to the optimum normalized cumulative value which is stored in the optimum normalized cumulative value memory 12 of the first embodiment. Hence, the step S52 obtains as the optimum threshold value j such that the difference between the reference normalized cumulative value and rlv[j] is a minimum.

Then, the binarization part 30 binarizes the multi-level image data of the divided small region based on the optimum threshold value and stores the bi-level image data in the bi-level image memory 31. In other words, a step S53 in FIG. 10 binarizes the multi-level image data of the divided small region based on the optimum threshold value j and stores the bi-level image data in the bi-level image memory 31.

A step S54 discriminates whether or not all of the divided small regions amounting to the predetermined fixed number of lines are processed. When the discrimination result in the step S54 is NO, the process returns to the step S43 so as to carry out the steps S43 through S53 with respect to the next divided small region. On the other hand, when the discrimination result in the step S54 is YES, a step S55 discriminates whether or not the entire document image is processed. The process returns to the step S41 when the discrimination result in the step S55 is NO. The process ends when the discrimination result in the step S55 is YES.

According to this embodiment, it is possible to automatically set the optimum threshold value for the binarization even when the printing quality of the document image is poor such as a case where a document printed on a wire dot printer, and it is possible to realize an excellent recognition rate of the image. Because the above described process is carried out independently for each of the divided small regions and not in one process which is carried out with respect to the entire document image, it is possible to obtain an optimum threshold value which accurately follows the local change in tone.

Figure 11:
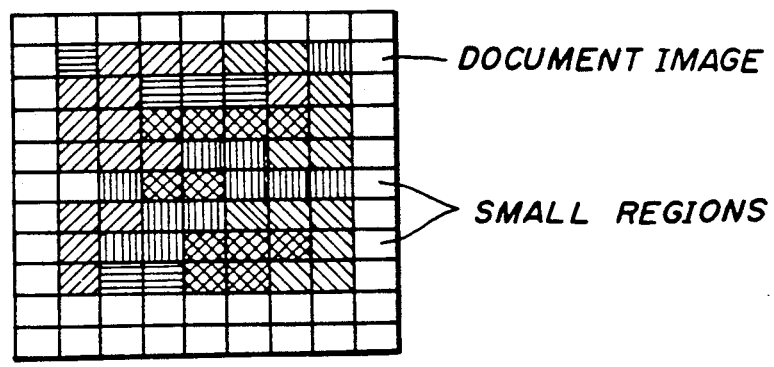
FIG. 11 is a diagram for explaining a local optimum binarization method employed in the fourth embodiment.

FIG. 11 is a diagram for explaining a local optimum binarization method employed in the fourth embodiment. The document image is divided horizontally and vertically into the fixed small regions as shown. The binarization is carried out with an optimum threshold value which is set independently for each of the fixed small regions which make up the document image.

Figure 12:
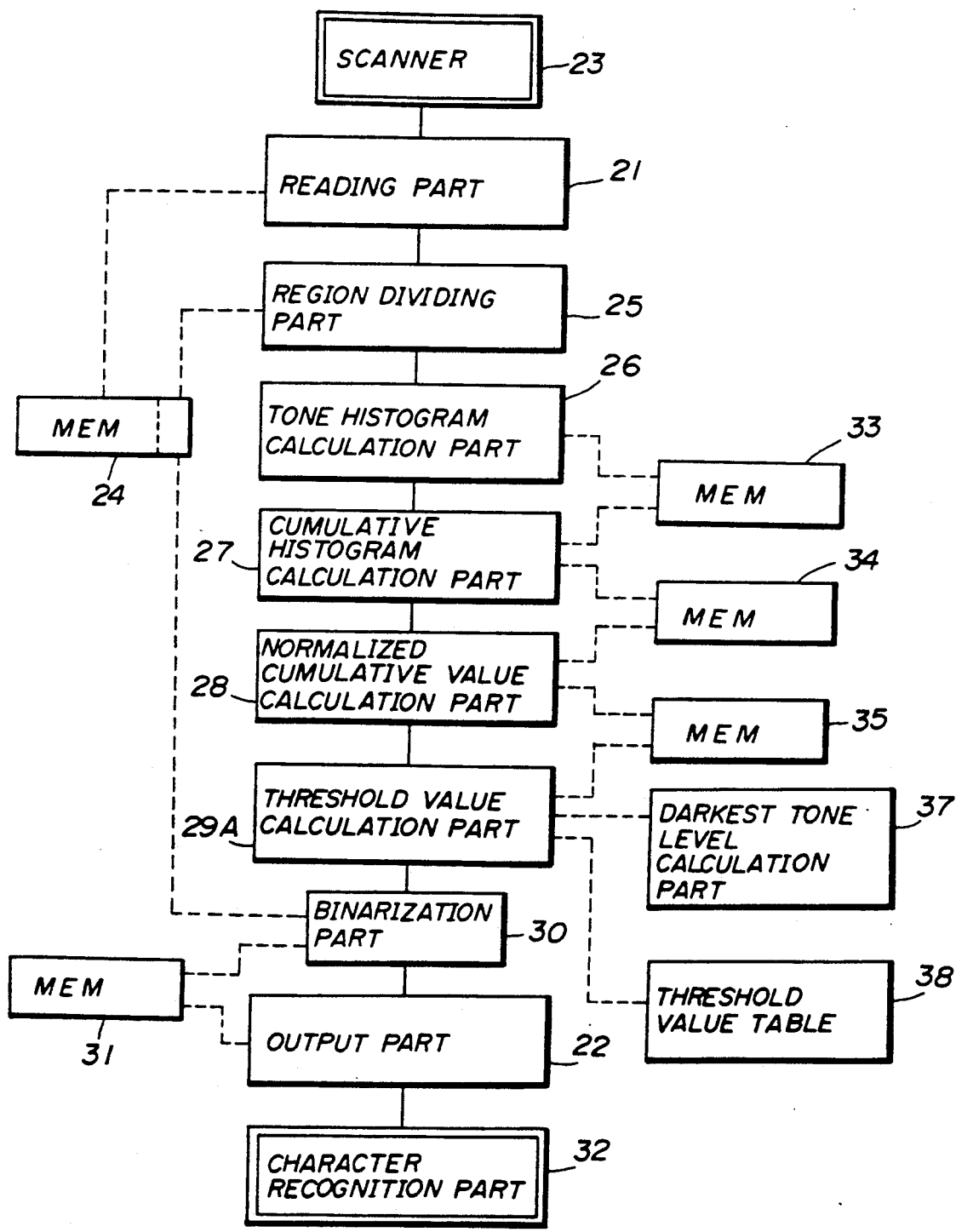
FIG. 12 is a system block diagram showing an image processing system to which a fifth embodiment of the binarization method according to the present invention is applied.
Figure 13:
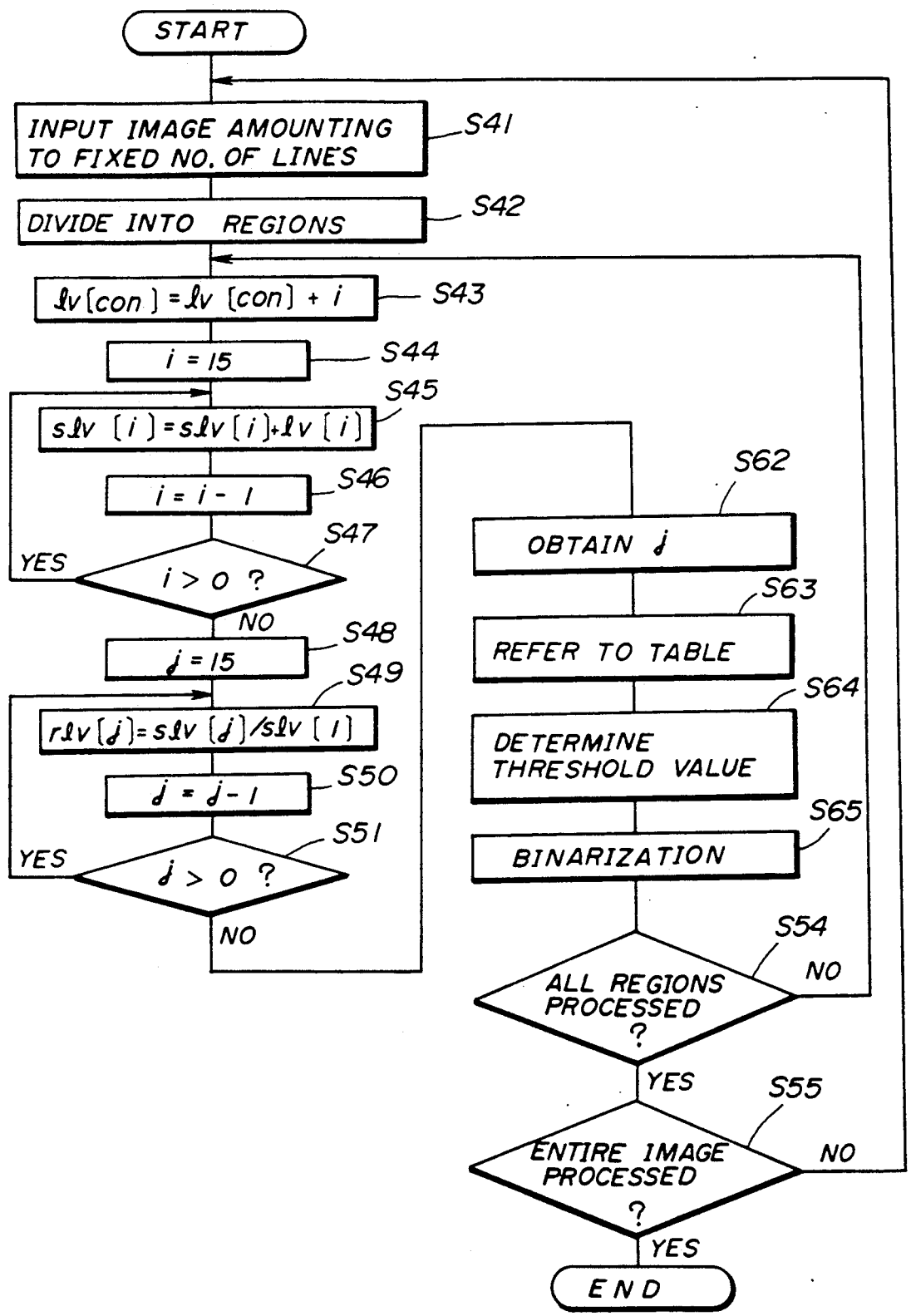
FIG. 13 is a flow chart showing an operation of the block system shown in FIG. 12 for explaining an operation of the fifth embodiment.

Next, a description will be given of a fifth embodiment of the binarization method according to the present invention, by referring to FIGS. 12 and 13. FIG. 12 shows an image processing system to which the fifth embodiment is applied, and FIG. 13 shows a flow chart showing an operation of the block system shown in FIG. 12 for explaining an operation of the fifth embodiment. In FIGS. 12 and 13, those parts which are essentially the same as those corresponding parts in FIGS. 9 and 10 are designated by the same reference numerals, and a description thereof will be omitted.

In this embodiment, a threshold value calculation part 29A is provided in place of the threshold value calculation part 29, and a darkest tone level calculation part 37 and a threshold value table 38 are provided in place of the reference normalized cumulative value memory 36.

The steps S41 through S51 shown in FIG. 13 are carried out similarly as in the case of the fourth embodiment. However, instead of determining the optimum threshold value with reference to the reference normalized cumulative value, this embodiment carries out an operation similar to that of the second embodiment. In other words, attention is drawn to the tone level at which the normalized cumulative values take a small value, that is, the tone level immediately before the image thins out and disappears, and this tone level is used to determine the threshold value for the binarization. This tone level corresponds to the tone level at which the darkest picture element in the document image starts to appear.

Depending on the kind of scanner 23 used, the span differs for each tone level. Hence, in order to more accurately obtain the threshold value, a predetermined tone level at which the normalized cumulative value closest to the optimum normalized cumulative value 5% is obtained, and a tone level which is between this predetermined tone level and the next closest tone level and at which the normalized cumulative value becomes closest to the optimum normalized cumulative value 5% is obtained. A tone level is then calculated from a value which is obtained by dividing the above difference by 10 by making an approximation to the first place of the decimal. From Table 1, the tone level at which the normalized cumulative value is closest to the optimum normalized cumulative value 5% is the tone level "11" which has the normalized cumulative value 5.58% and the next closest tone level is the tone level "12" which has the normalized cumulative value 1.51%. Hence, the difference between the normalized cumulative values for the two tone levels is divided by 10 to obtain (5.58−1.51)/10=0.407, and this value "0.407" is used to carry out the following calculation so as to obtain the fine tone levels between the tone levels "11" and "12".

| | |
|---|---|
| 1.51+0.407×1=1.197 | Tone Level 11.9 |
| 1.51+0.407×2=2.324 | Tone Level 11.8 |
| 1.51+0.407×8=4.766 | Tone Level 11.2 |
| 1.51+0.407×9=5.173 | Tone Level 11.1 |

The tone level at which the normalized cumulative value becomes closest to the optimum normalized cumulative value 5% is selected from the above tone levels which are calculated by making the approximation to the first place of the decimal. The above described process is carried out by the darkest tone level calculation part 37. In this case, the tone level which has the normalized cumulative value closest to the optimum normalized cumulative value 5% is the tone level "11.1". The threshold value calculation part 29A uses this tone level "11.1" to refer to the threshold value table 38 shown in FIG. 12 to determine the optimum threshold value. The threshold value table 38 is obtained beforehand by conducting experiments and an example of the content thereof is shown in Table 2. In this example, the optimum threshold value (scanner reading level) is set to "7".

TABLE 2

| Tone Level at which Darkest Tone Appears | Optimum Threshold Value (Scanner Reading Level) |
|---|---|
| 12.8– | 5 |
| 12.0–12.7 | 6 |
| 11.1–11.9 | 7 |
| 9.6–11.0 | 8 |
| 7.7–9.5 | 9 |
| 7.0–7.6 | A |
| –6.9 | B |

In the flow chart shown in FIG. 13, a step S62 obtains j such that the difference between the percentage of the darkest tone level and rlv[j] becomes a minimum by carrying out a calculation and making an approximation to the first place of the decimal. In addition, a step S63 refers to the threshold value table 38. A step S64 determines the optimum threshold value based on the information read out from the threshold value table 38, and a step S65 binarizes the multi-level image data of the divided small region by use of the optimum threshold value which is determined in the step S64.

According to this embodiment, it is also possible to automatically set the optimum threshold value for the binarization even when the printing quality of the document image is poor such as a case where a document printed on a wire dot printer, and it is possible to realize an excellent recognition rate of the image.

Figure 14:
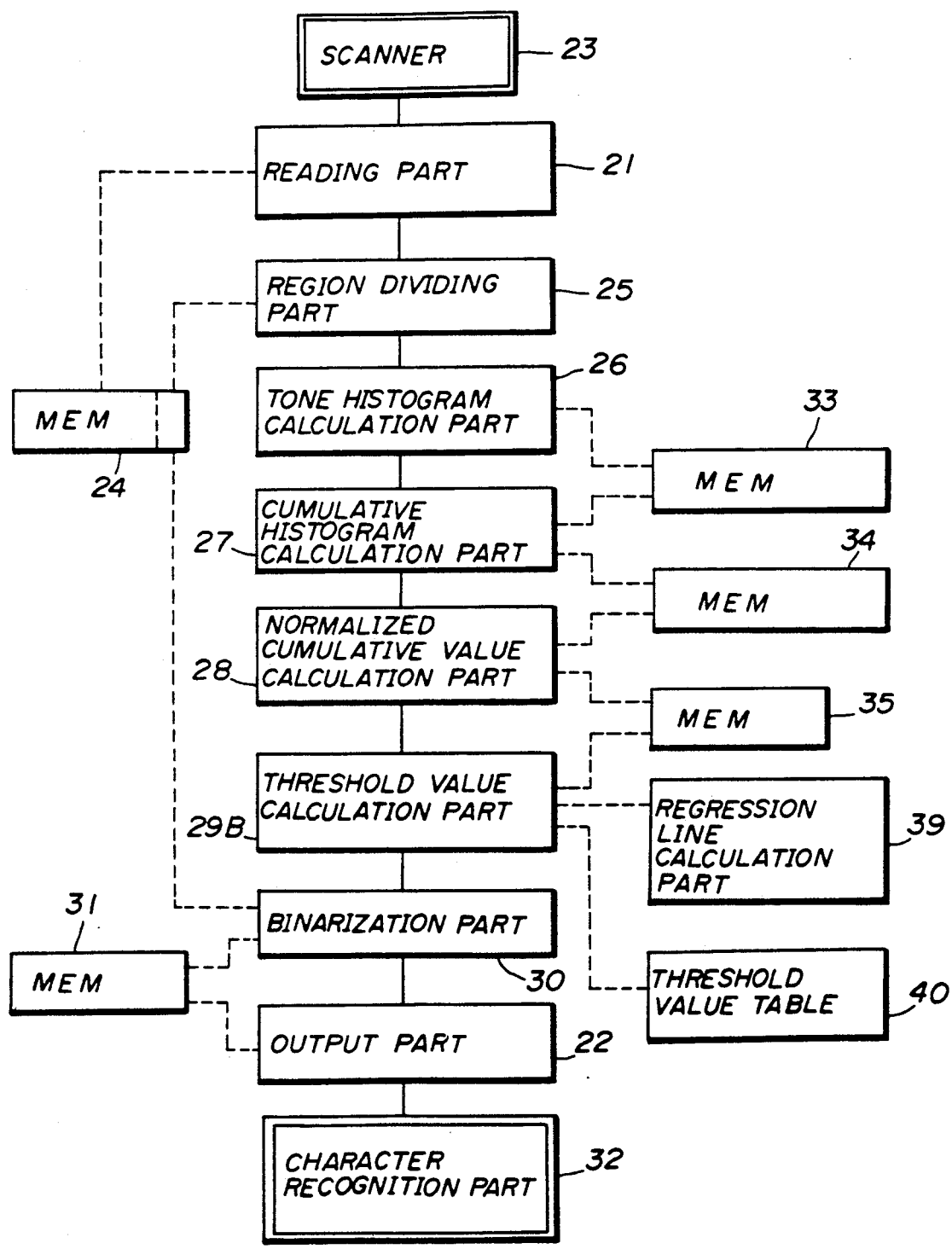
FIG. 14 is a system block diagram showing an image processing system to which a sixth embodiment of the binarization method according to the present invention is applied.
Figure 15:
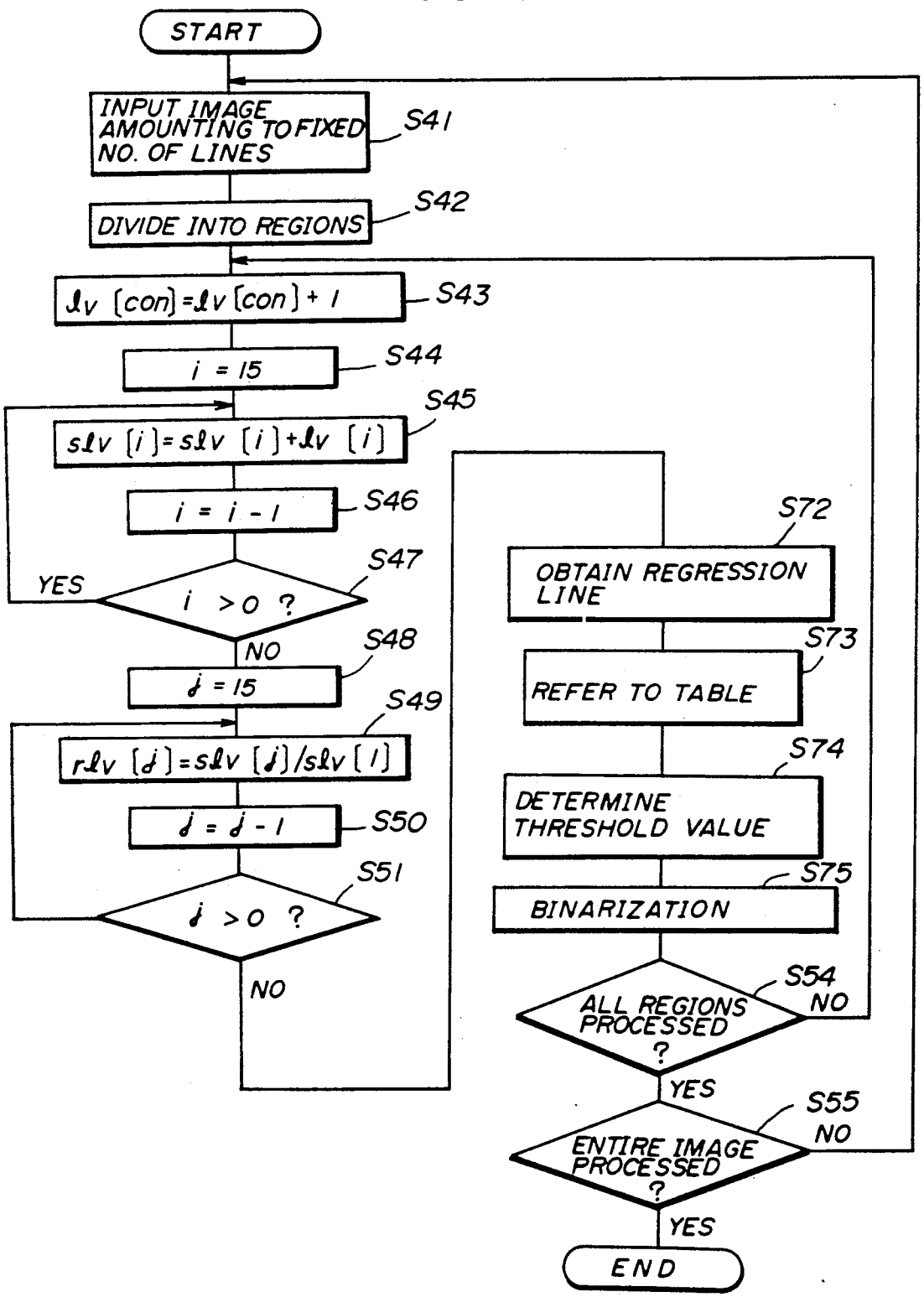
FIG. 15 is a flow chart showing an operation of the block system shown in FIG. 14 for explaining an operation of the sixth embodiment.

Next, a description will be given of a sixth embodiment of the binarization method according to the present invention, by referring to FIGS. 14 and 15. FIG. 14 shows an image processing system to which the sixth embodiment is applied, and FIG. 15 shows a flow chart showing an operation of the block system shown in FIG. 14 for explaining an operation of the sixth embodiment. In FIGS. 14 and 15, those parts which are essentially the same as those corresponding parts in FIGS. 9 and 10 are designated by the same reference numerals, and a description thereof will be omitted.

In this embodiment, a threshold value calculation part 29B is provided in place of the threshold value calculation part 29, and a regression line calculation part 39 and a threshold value table 40 are provided in place of the reference normalized cumulative value memory 36.

The steps S41 through S51 show in FIG. 15 are carried out similarly as in the case of the fourth embodiment. However, this embodiment determines the optimum threshold value from the normalized cumulative values which are obtained with respect to each of the divided small regions, that is, carries out an operation similar to that of the third embodiment.

The regression line calculation part 39 calculates the inclination of the regression line, and the threshold value calculation part 29B makes reference to the threshold value table 40 using the calculated inclination and determines the optimum threshold value for the divided small region. The threshold value table 40 corresponds to the threshold value table 13B of the third embodiment, and Table 3 shows an example of the content thereof.

TABLE 3

| Inclination G of Regression Line | Optimum Threshold Value (Scanner Reading Level) |
|---|---|
| $-6.0 < G \leq -4.0$ | 5 |
| $-6.9 < G \leq -6.0$ | 6 |
| $-7.8 < G \leq -6.9$ | 7 |
| $-9.8 < G \leq -7.8$ | 8 |
| $-13.9 < G \leq -9.8$ | 9 |
| $-16.8 < G \leq -13.9$ | A |
| $-20.0 < G \leq -16.8$ | B |

In the flow chart shown in FIG. 15, a step S72 obtains the regression line of the relationship between the percentage of the normalized cumulative value and the tone level. In addition, a step S73 refers to the threshold value table 40. A step S74 determines the optimum threshold value based on the information read out from the threshold value table 40, and a step S75 binarizes the multi-level image data of the divided small region by use of the optimum threshold value which is determined in the step S74.

Figure 18:
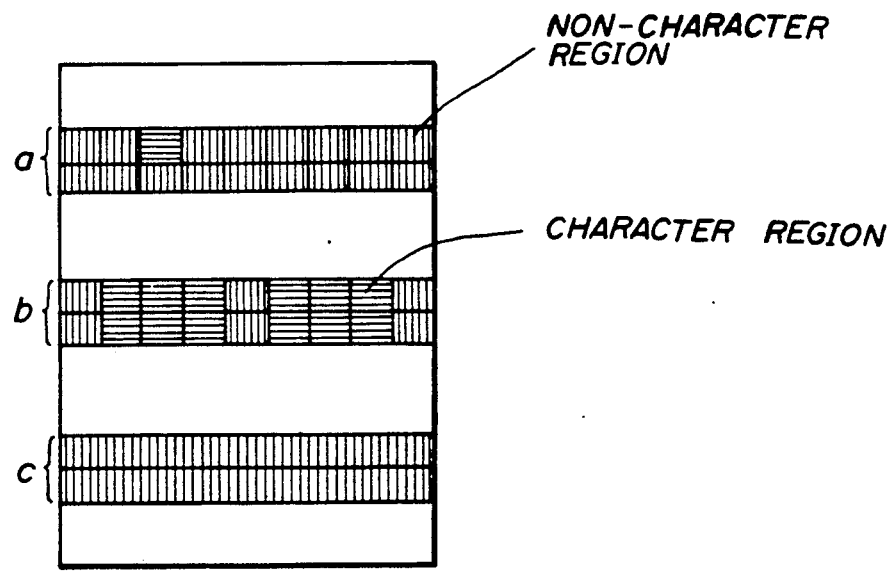
FIG. 18 is a diagram for explaining an optimum binarization method employed in the seventh embodiment.
Figure 16:
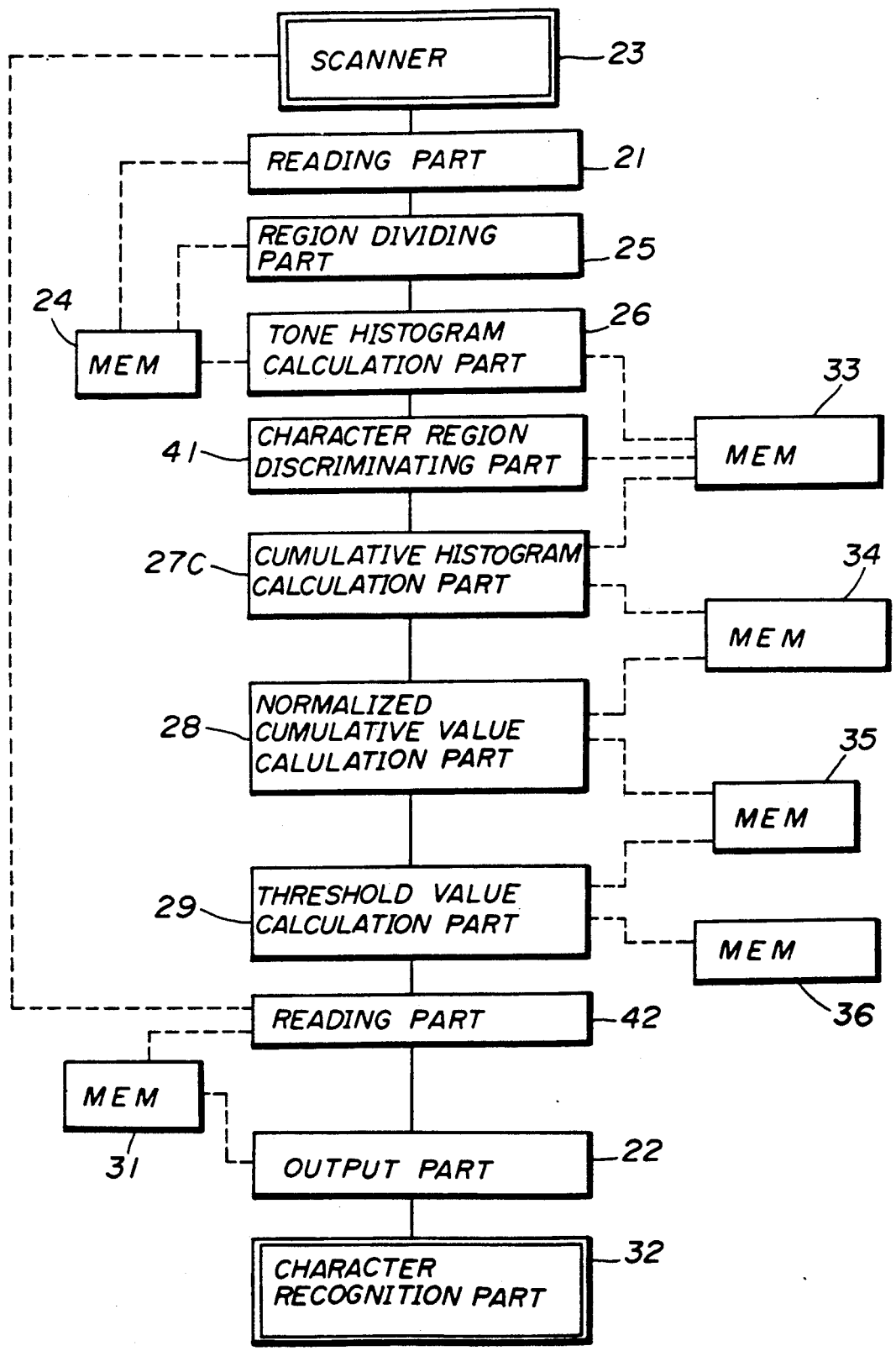
FIG. 16 is a system block diagram showing an image processing system to which a seventh embodiment of the binarization method according to the present invention is applied.
Figure 17A:
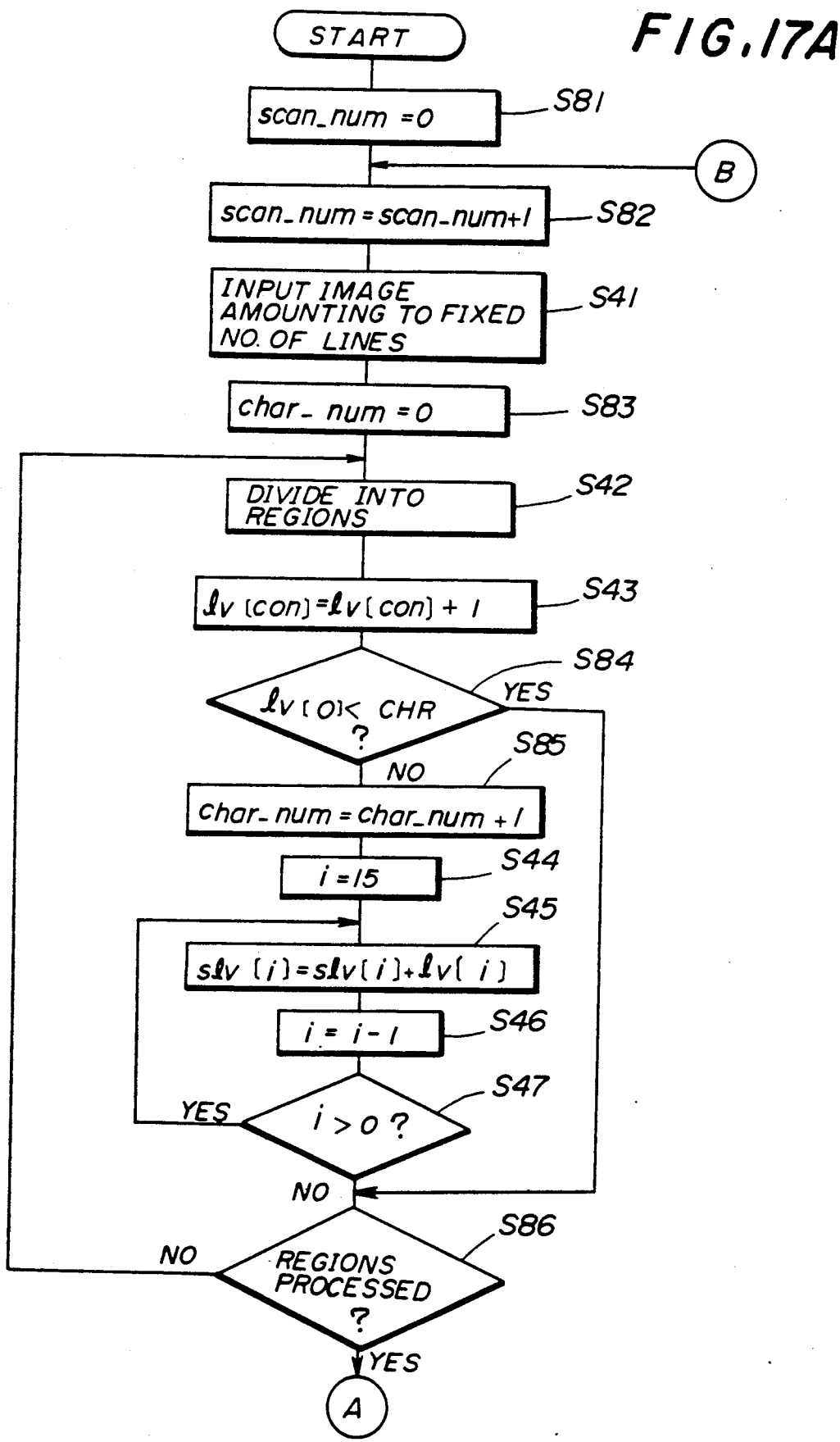

Next, a description will be given of a seventh embodiment of the binarization method according to the present invention, by referring to FIGS. 16 through 18. FIG. 16 shows an image processing system to which the seventh embodiment is applied, and FIG. 17 shows a flow chart showing an operation of the block system shown in FIG. 16 for explaining an operation of the seventh embodiment. In FIGS. 16 and 17, those parts which are essentially the same as those corresponding parts in FIGS. 9 and 10 are designated by the same reference numerals, and a description thereof will be omitted.

First, a general operation of this embodiment will be given with reference to FIG. 18. In FIG. 18, the multi-level image data amounting to a predetermined fixed number of lines is read and the image portion such as regions a, b and c described by the lines is divided into small regions. A discrimination is made to determine whether or not each small region is a character region which constitutes a portion of a character, and a discrimination is then made to determine whether or not the number of character regions exceeds a predetermined value. In the image portion a, the number of character regions does not exceed the predetermined value, and thus a similar process is carried out by reading the multi-level image data amounting to a next predetermined fixed number of lines. In the image portion b, the number of character regions exceeds the predetermined value. In this case, the character regions are integrated into an integrated region and the optimum threshold value is determined with respect to this integrated region by use of the method employed in the fourth embodiment. The optimum threshold value which is determined is used as the optimum threshold value with respect to the entire document image.

When the optimum threshold value is determined at the time when a certain image portion is read, the process of determining the threshold value ends and this threshold value is set to the scanner 23 as the scanner reading level (binarization slicing level). By making the scanner 23 scan the image for the second time with the optimum threshold value, it is possible to directly input the bi-level image data.

Next, a more detailed description will be given of this seventh embodiment. In this embodiment, a character region discriminating part 41 for discriminating whether or not the small region is a character region, and a bi-level image reading part 42 for reading the bi-level image data from the scanner 23 are additionally provided. In addition, a cumulative histogram calculation part 27C is provided in place of the cumulative histogram calculation part 27.

In FIG. 17, a step S81 sets a number of times a read operation is made by the scanner 23 (that is, the number of scans) to zero by setting scan_num=0. A step S82 increments the number of scans to scan_num=-scan_num+1. Then, the step S41 reads a predetermined fixed number of lines of the multi-level image data which is received by the multi-level image reading part 21 from the scanner 21 and stores the lines in the multi-level image memory 24 as in the case of the fourth embodiment. A step S83 sets a number of character regions to zero by setting char_num=0. The step S42 divides the multi-level image data stored in the multi-level image memory 24 into fixed small regions, and the step S43 forms the tone histogram lv[con] for one small region in the tone histogram calculation part 26 by carrying out the operation lv[con]=lv[con]+1 and stores the tone histogram in the tone histogram memory 33.

Every time the tone histogram is obtained for one small region, a step S84 discriminates in the character region discrimination part 41 whether or not the number of picture elements vl[0] having the tone level "0" in the small region is smaller than a read discrimination threshold value CHR which is read out from the tone histogram memory 33. The small region is discriminated as a character region when lv[0]≧CHR. When the discrimination result in the step S84 is NO, a step S85 increments the number of character regions to char_num=char_num+1. The picture element having the tone level "0" corresponds to the picture elements making up the white background of the document image. A large number of white picture elements exist within the character region but white picture elements hardly exist within a photograph region, and this is the reason why it is possible to discriminate the character region. The steps S44 through S47 are carried out similarly to the fourth embodiment but only with respect to the small region which is discriminated as the character region. In other words, the cumulative histogram calculation part 27C forms the cumulative histogram slv[i] and stores this cumulative histogram slv[i] in the cumulative histogram memory 34.

After the step S46 or when the discrimination result in the step S84 is YES, a step S86 discriminates whether or not all of the divided small regions amounting to the predetermined fixed number of lines are processed. The process returns to the step S42 when the discrimination result in the step S86 is NO. On the other hand, when the discrimination result in the step S86 is YES, a step S87 discriminates whether or not char_num>CHRTH, where CHRTH denotes a threshold value of the number of character regions. A step S88 discriminates whether or not scan_num>SCANTH, where SCANTH denotes a threshold value of the number of scans. The process returns to the step S82 to read the multi-level image data amounting to the next predetermined fixed number of lines only when the discrimination result in the step S88 is NO. In other words, the above described process is similarly carried out with respect to the next predetermined fixed number of lines when the discrimination result in the step S88 is NO.

When the discrimination result in the step S87 is YES, a step S90 integrates the cumulative values slv of the character regions. In other words, the cumulative histogram calculation part 27C reads the cumulative histogram of all of the small regions which are discriminated as the character region, and cumulates the cumulative values for each tone level so as to form a cumulative histogram for all of the tone levels with respect to an integrated region of all the small regions which are discriminated as the character region. The obtained cumulative histogram is then stored in the cumulative histogram memory 34. The cumulative value for each tone level indicates the number of black picture elements within the integrated region when the tone level is taken as the threshold value.

After the step S90, the steps S48 through S51 are carried out similarly to the fourth embodiment. That is, the normalized cumulative value calculation part 28 carries out the normalizing process with respect to the integrated cumulative histogram, and the normalized cumulative value is stored in the normalized cumulative value memory 35. Then, the threshold value calculation part 29 determines the optimum threshold value similarly to the fourth embodiment.

When the optimum threshold value is determined, the bi-level image reading part 42 sets the optimum threshold value as the scanner reading level and makes the scanner 23 read the document image for the second time. The bi-level image data output from the scanner 23 is read directly by the bi-level image reading part 42 and stored in the bi-level image memory 31. In other words, a step S91 determines the scanner reading level from j such that a difference between the reference normalized cumulative value and rlv[j] becomes a minimum, and a step S92 reads the bi-level image data from the scanner 23.

In a case where the optimum threshold value cannot be determined even when the number of scans of the scanner 23 exceeds the threshold value SCANTH, the bi-level image data is read from the scanner 23 with a fixed scanner reading level. In other words, when the discrimination result in the step S88 is YES, a step S89 sets the scanner reading level to default and the process advances to the step S92.

Therefore, the steps S42 and S43 form the tone histogram, the steps S84 and S85 discriminate and count the character regions, and the steps S44 through S47 form the cumulative histogram. The step S86 discriminates the number of character regions, and the steps S48 through S51 form the normalized histogram.

According to this embodiment, a portion of the multi-level image which is processed is small compared to that of the fourth embodiment. Hence, it is possible to make carry out the required process at a high speed. In addition, because the optimum threshold value is determined based on the integration region which integrates the small regions which are discriminated as the character region, the threshold value can be stably determined for each region thereby making it possible to obtain a bi-level image having a satisfactory quality.

Figure 19:
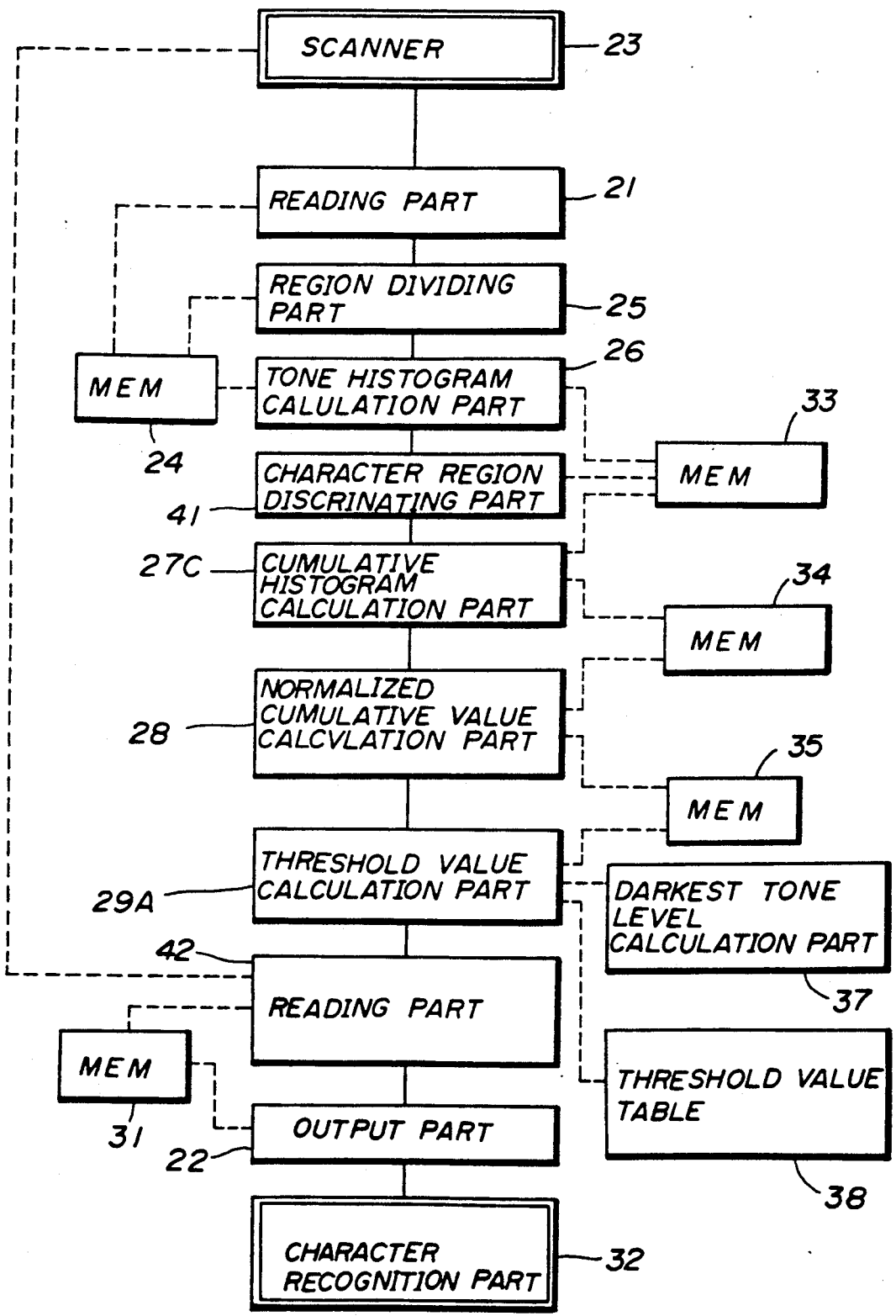
FIG. 19 is a system block diagram showing an image processing system to which an eighth embodiment of the binarization method according to the present invention is applied.
Figure 20A:
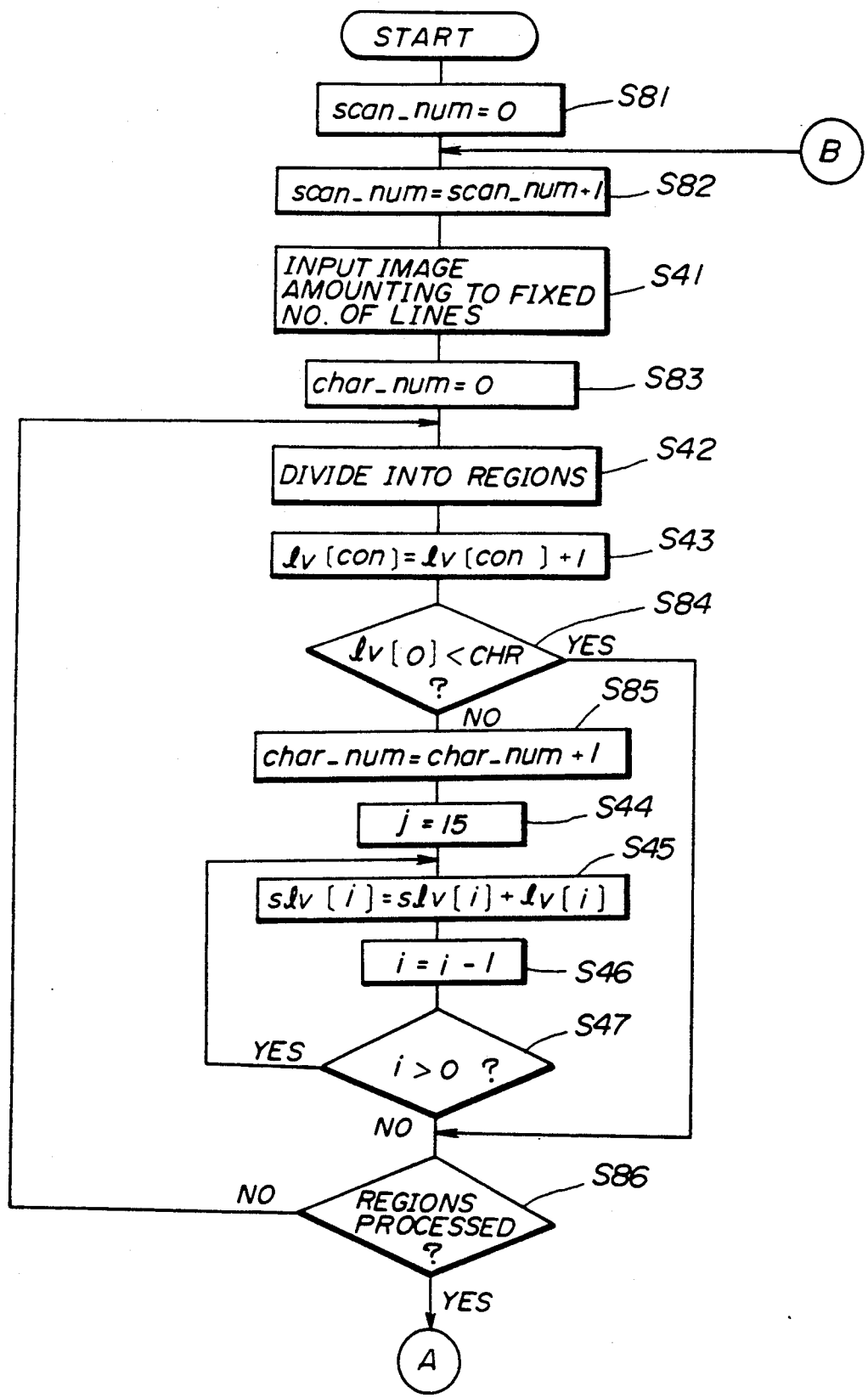
FIGS. 20A and 20B are flow charts showing an operation of the block system shown in FIG. 19 for explaining an operation of the eighth embodiment.
Figure 20B:
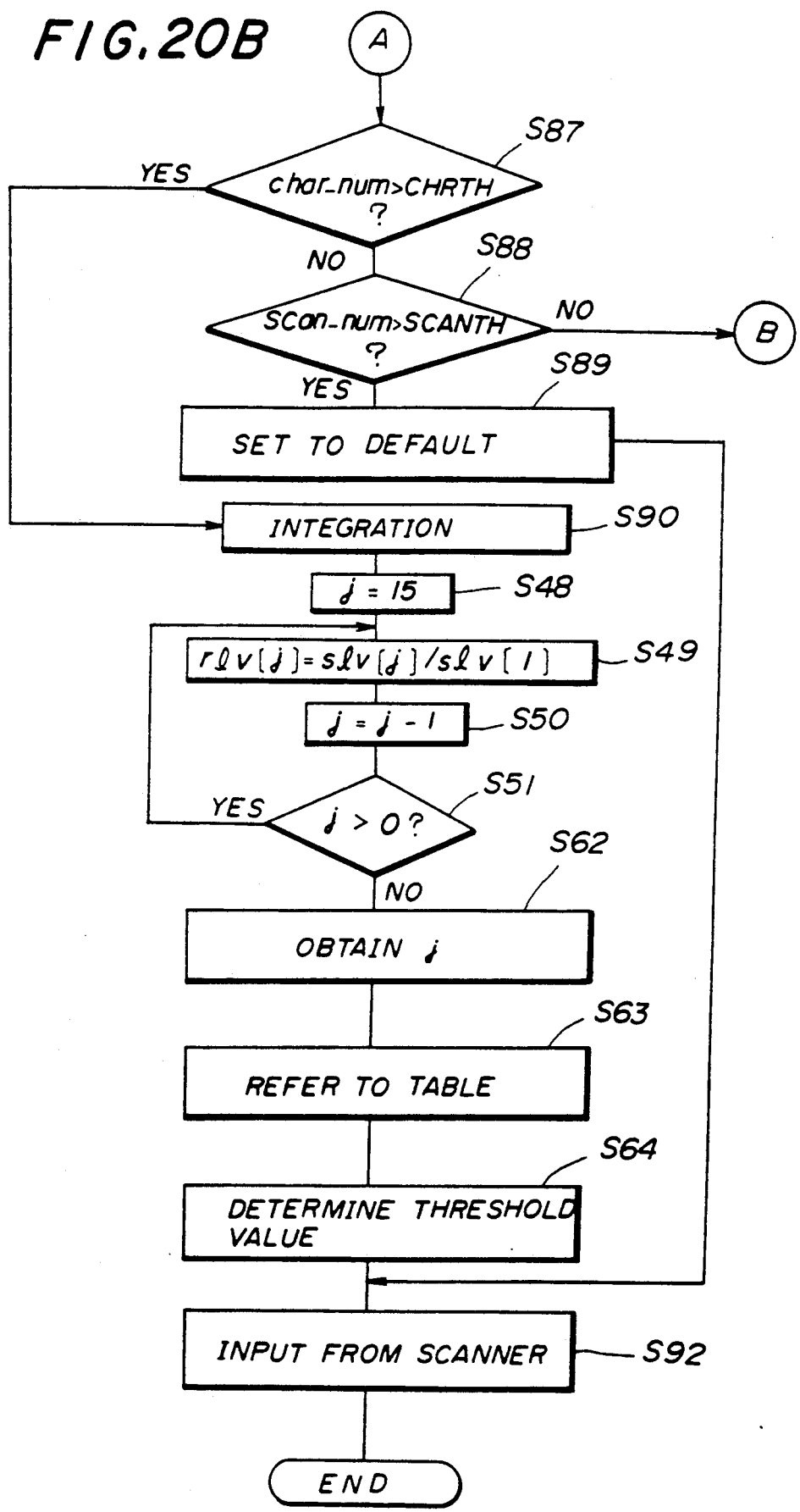

Next, a description will be given of an eighth embodiment of the binarization method according to the present invention, by referring to FIGS. 19 and 20. FIG. 19 shows an image processing system to which the eighth embodiment is applied, and FIG. 20 shows a flow chart showing an operation of the block system shown in FIG. 19 for explaining an operation of the eighth embodiment. In FIGS. 19 and 20, those parts which are essentially the same as those corresponding parts in FIGS. 16 and 17 are designated by the same reference numerals, and a description thereof will be omitted.

As may be seen by comparing FIGS. 19 and 16, the image processing system to which this eighth embodiment is applied is basically the same as that of the seventh embodiment except for the portion which carries out the process related to the determination of the threshold value. This portion of the image processing system is modified similarly to the fifth embodiment.

As for the flow chart shown in FIG. 20, the flow chart shown in FIG. 20 is basically the same as that shown in FIG. 17 except that the process related to the determination of the threshold value is modified similarly to the fifth embodiment.

Figure 22A:
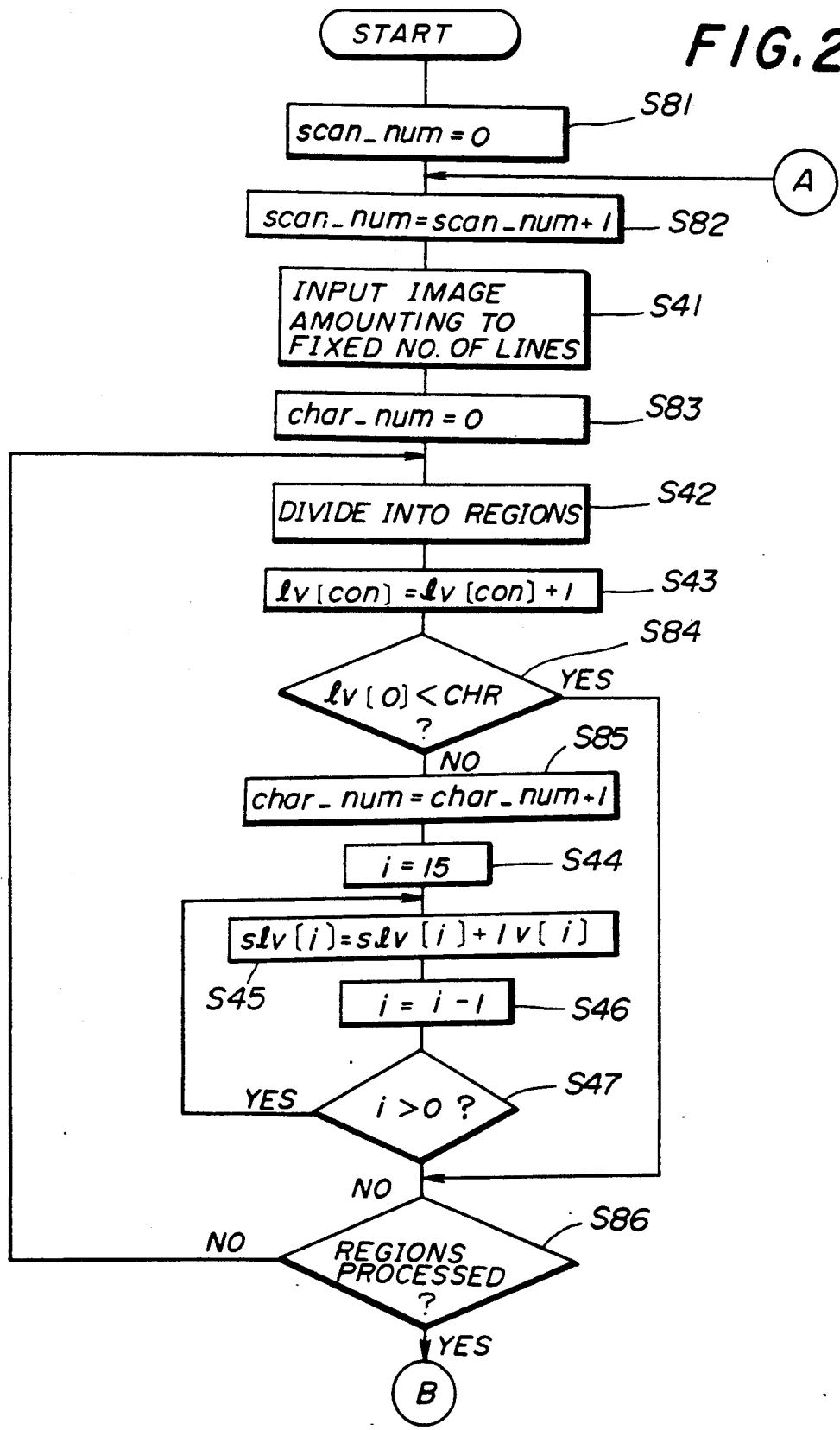
FIGS. 22A and 22B are flow charts showing an operation of the block system shown in FIG. 21 for explaining an operation of the ninth embodiment.
Figure 22B:
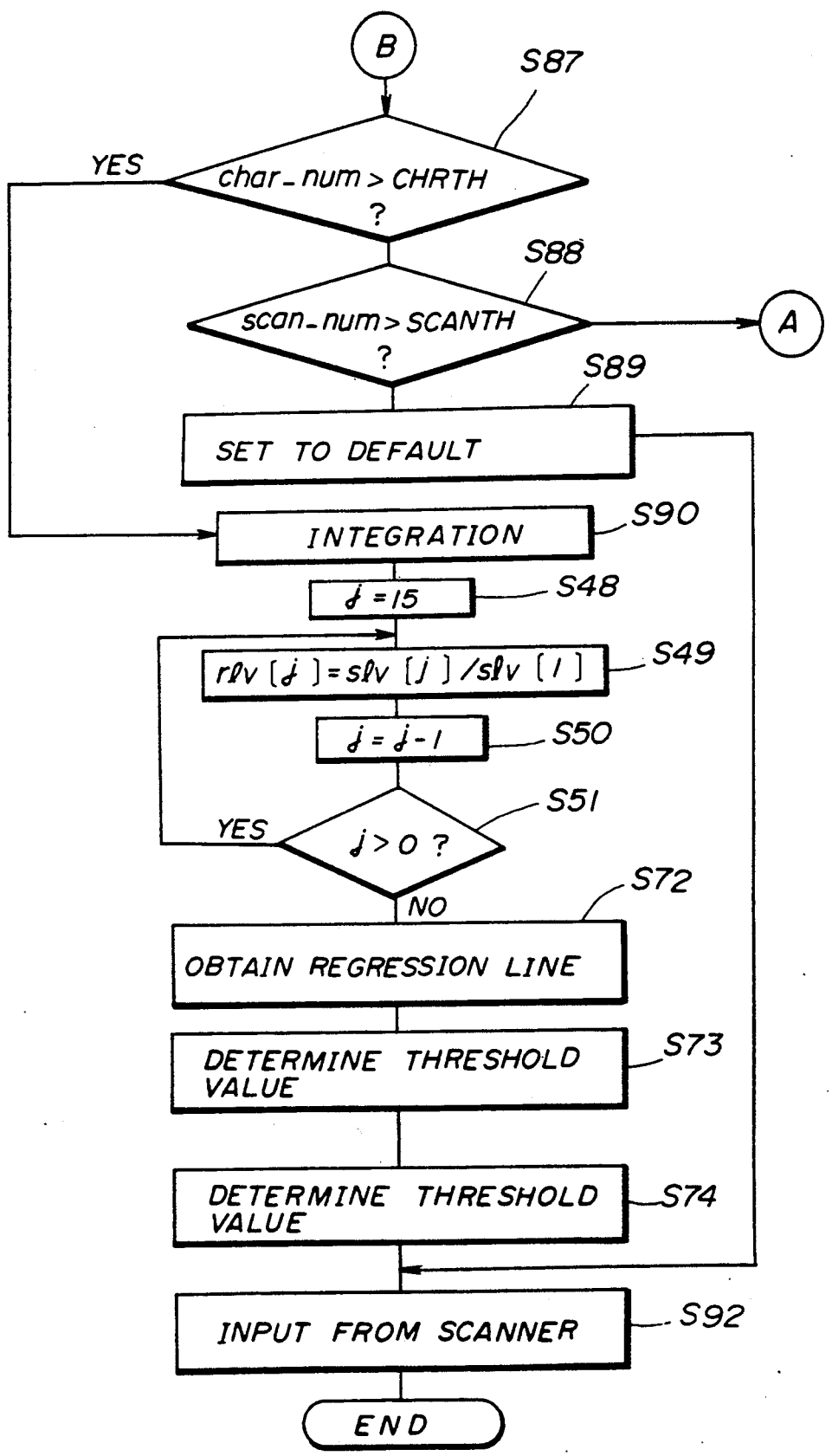

Next, a description will be given of a ninth embodiment of the binarization method according to the present invention, by referring to FIGS. 21 and 22. FIG. 21 shows a image processing system to which the ninth embodiment is applied, and FIG. 22 shows a flow chart showing an operation of the block system shown in FIG. 21 for explaining an operation of the ninth embodiment. In FIGS. 21 and 22, those parts which are essentially the same as those corresponding parts in FIGS. 16 and 17 are designated by the same reference numerals, and a description thereof will be omitted.

As may be seen by comparing FIGS. 21 and 16, the image processing system to which this ninth embodiment is applied is basically the same as that of the seventh embodiment except for the portion which carries out the process related to the determination of the threshold value. This portion of the image processing system is modified similarly to the sixth embodiment.

As for the flow chart shown in FIG. 22, the flow chart shown in FIG. 22 is basically the same as that shown in FIG. 17 except that the process related to the determination of the threshold value is modified similarly to the fifth embodiment.

Figure 23:
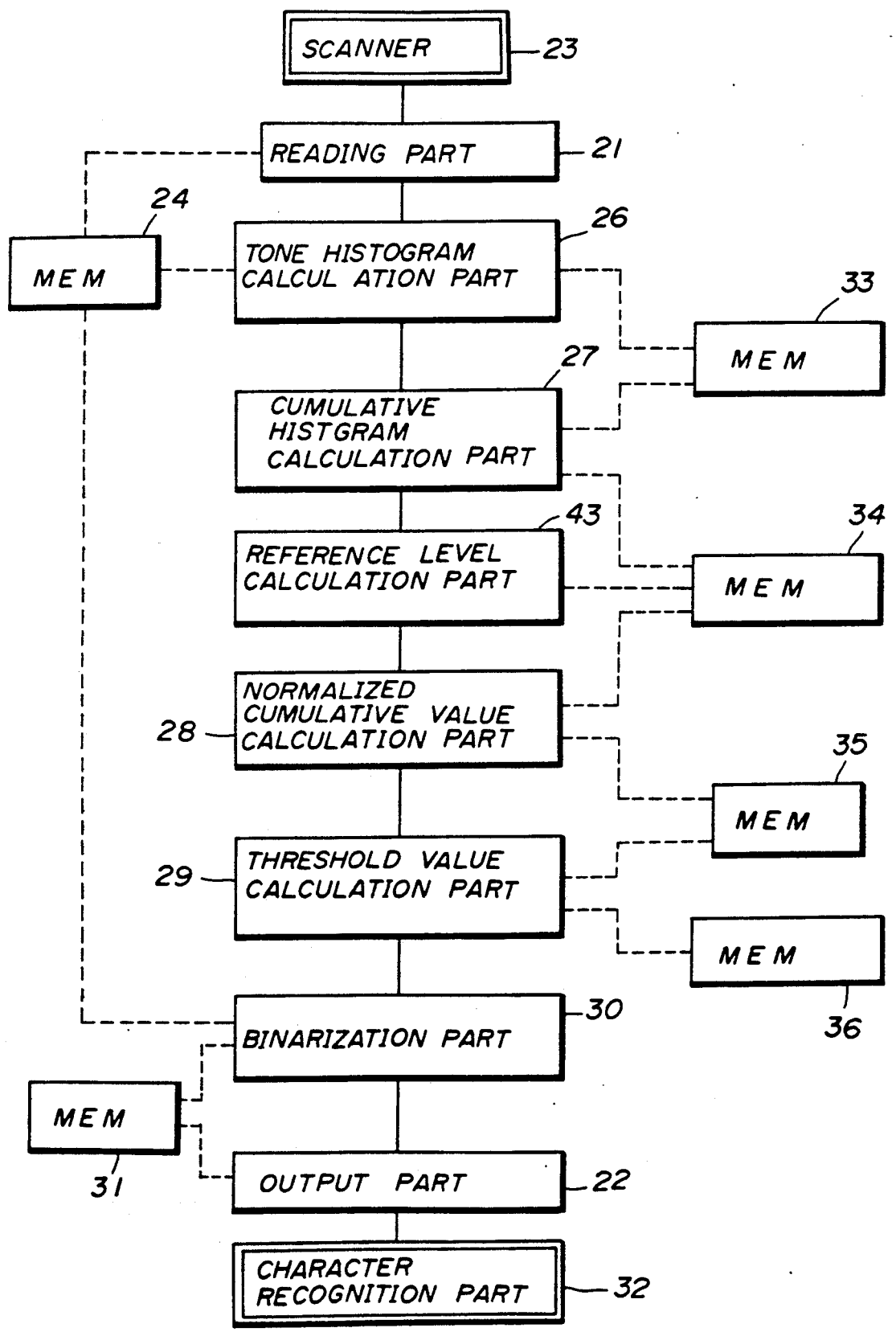
FIG. 23 is a system block diagram showing an image processing system to which a tenth embodiment of the binarization method according to the present invention is applied.
Figure 24:
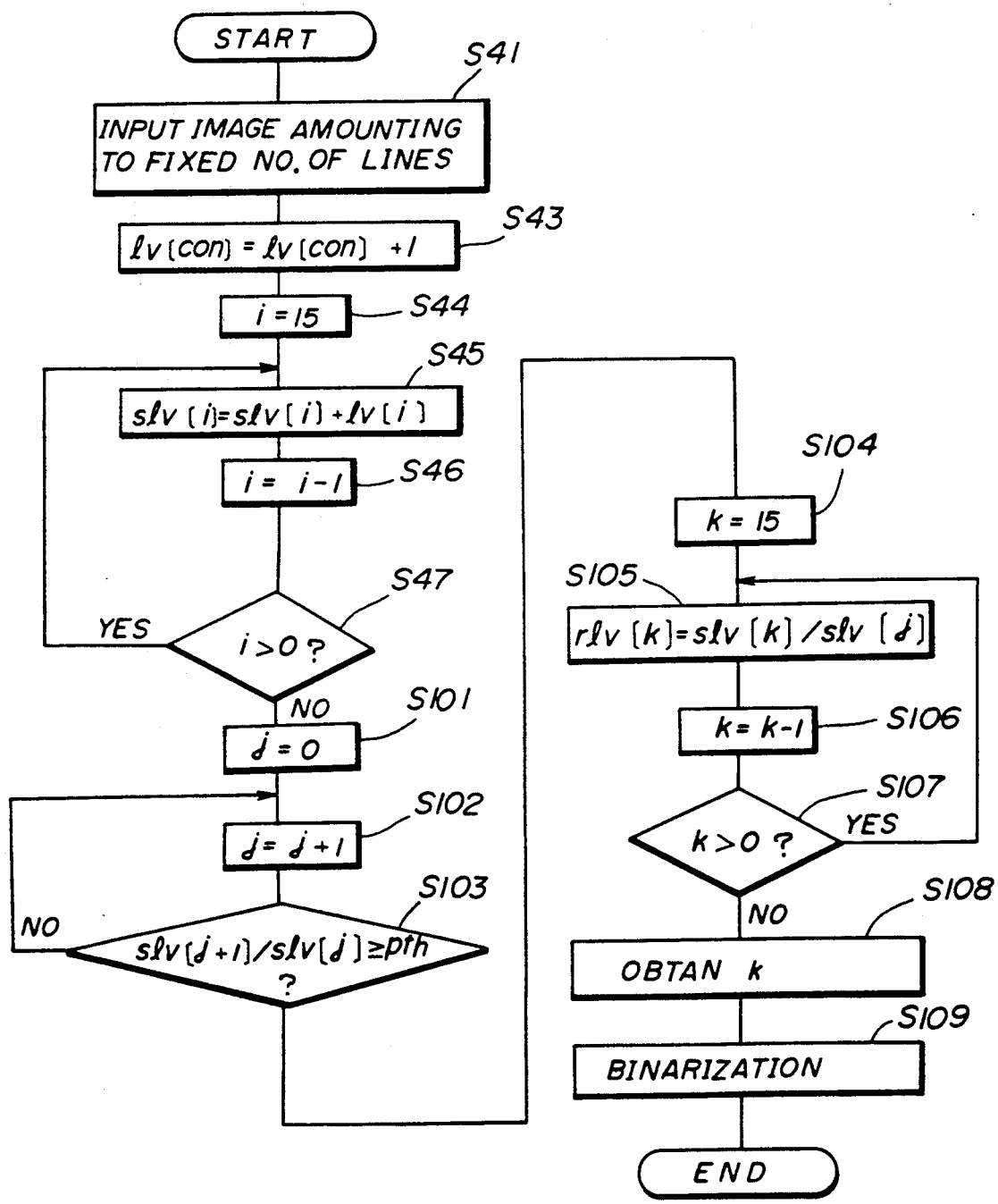
FIG. 24 is a flow chart showing an operation of the block system shown in FIG. 23 for explaining a operation of the tenth embodiment.

Next, a description will be given of a tenth embodiment of the binarization method according to the present invention, by referring to FIGS. 23 and 24. FIG. 23 shows an image processing system to which the tenth embodiment is applied, and FIG. 24 shows a flow chart showing an operation of the block system shown in FIG. 23 for explaining an operation of the tenth embodiment. In FIGS. 23 and 24, those parts which are essentially the same as those corresponding parts in FIGS. 16 and 17 are designated by the same reference numerals, and a description thereof will be omitted.

As may be seen by comparing FIGS. 23 and 9, the image processing system shown in FIG. 23 is essentially the same as that shown in FIG. 9 except that no region dividing part 25 is provided in FIG. 23 and instead a reference level calculation part 43 is provided to adaptively determine a reference tone level for using in normalizing the cumulative value.

In the flow chart shown in FIG. 24, the process differs from that shown in FIG. 10 in that the histogram is generated without dividing the multi-level image data into the small regions. Further, in FIG. 24, there are additional processes for determining a reference tone level and for normalizing the cumulative value using the reference tone level.

First, a description will be given of the process of determining the reference tone level. The reference tone level in this embodiment is the lightest tone level in the document image excluding the background tone of the document. In the case of a document which is printed on a white paper, the white background corresponds to the background tone. In the document image, the picture elements having the background tone constitute a majority out of the picture elements having the various tones. Hence, it is possible to discriminate the background tone when the number of picture elements having a certain tone undergoes an extreme change.

In FIG. 24, a step S101 sets j to j=0, and a step S102 increments j to j=j+1. A step S103 discriminates whether or not $slv[j+1]/slv[j] \geq Pth$, where Pth denotes a threshold value which is used for the discriminating the background tone level. This discrimination step S103 is carried out in the reference level calculation part 43, and $slv[j]$ and $slv[j+1]$ are obtained from the cumulative histogram memory 34. The tone level j which first satisfies the condition $slv[j+1]/slv[j] \geq Pth$ is regarded as the reference tone level and is set in the normalized cumulative value calculation part 28.

The threshold value Pth is normally set to approximately 0.75. In the case of a cumulative histogram shown in Table 4, the condition $slv[j+1]/slv[j] \geq Pth$ is first satisfied when j=2 and the reference tone level is set to "2" in this case.

TABLE 4

| Tone Level | Tone Histogram | Cumulative Value | Normalized Cumulative Value |
|---|---|---|---|
| 15 | 0 | 0 | 0.00 |
| 14 | 0 | 0 | 0.00 |
| 13 | 0 | 0 | 0.00 |
| 12 | 7 | 7 | 0.00 |
| 11 | 2580 | 2587 | 1.68 |
| 10 | 8460 | 11047 | 7.21 |
| 9 | 21838 | 32885 | 21.46 |

TABLE 4-continued

| Tone Level | Tone Histogram | Cumulative Value | Normalized Cumulative Value |
|---|---|---|---|
| 8 | 14911 | 47796 | 31.19 |
| 7 | 19127 | 66923 | 43.67 |
| 6 | 19939 | 86862 | 56.69 |
| 5 | 18036 | 104898 | 68.46 |
| 4 | 14959 | 119857 | 78.22 |
| 3 | 16812 | 136669 | 89.19 |
| 2 | 16548 | 153217 | 100.00 |
| 1 | 100297 | 253514 | — |
| 0 | 746486 | 1000000 | — |

When the discrimination result in the step S103 is YES, a step S104 sets k to k=15, and a step S105 sets $rlv[k]$ to $rlv[k]=slv[k]/slv[j]$. A step S106 decrements k to k=k−1, and a step S107 discriminates whether or not k>0. The process returns to the step S105 when the discrimination result in the step S107 is YES. On the other hand, when the discrimination result in the step S107 is NO, a step S108 obtains as the threshold value k such that a difference between the reference normalized accumulated value and $rlv[k]$. Then, a step S109 binarizes the multi-level image data using the threshold value k.

In other words, the normalized cumulative value calculation part 28 takes as the reference the cumulative value for the reference tone level which is set by the reference level calculation part 43 and normalizes the cumulative value for each tone level. Accordingly, in the case of the cumulative histogram shown in Table 4, the normalized cumulative values shown are obtained when it is assumed for the sake of convenience that the reference tone level is "2".

Therefore, the steps S101 through S103 determine the reference tone level, and the steps S104 through S107 form the normalized histogram.

According to this embodiment, the reference tone level which is used for the normalization is not fixed to the tone level "1" but is adaptively determined depending on the background tone level of the document image. For this reason, even when a background noise exists in the document image such as the case of a copied document, it is possible to obtain a bi-level image using an optimum threshold value and a high recognition rate is thus obtainable.

Figure 25:
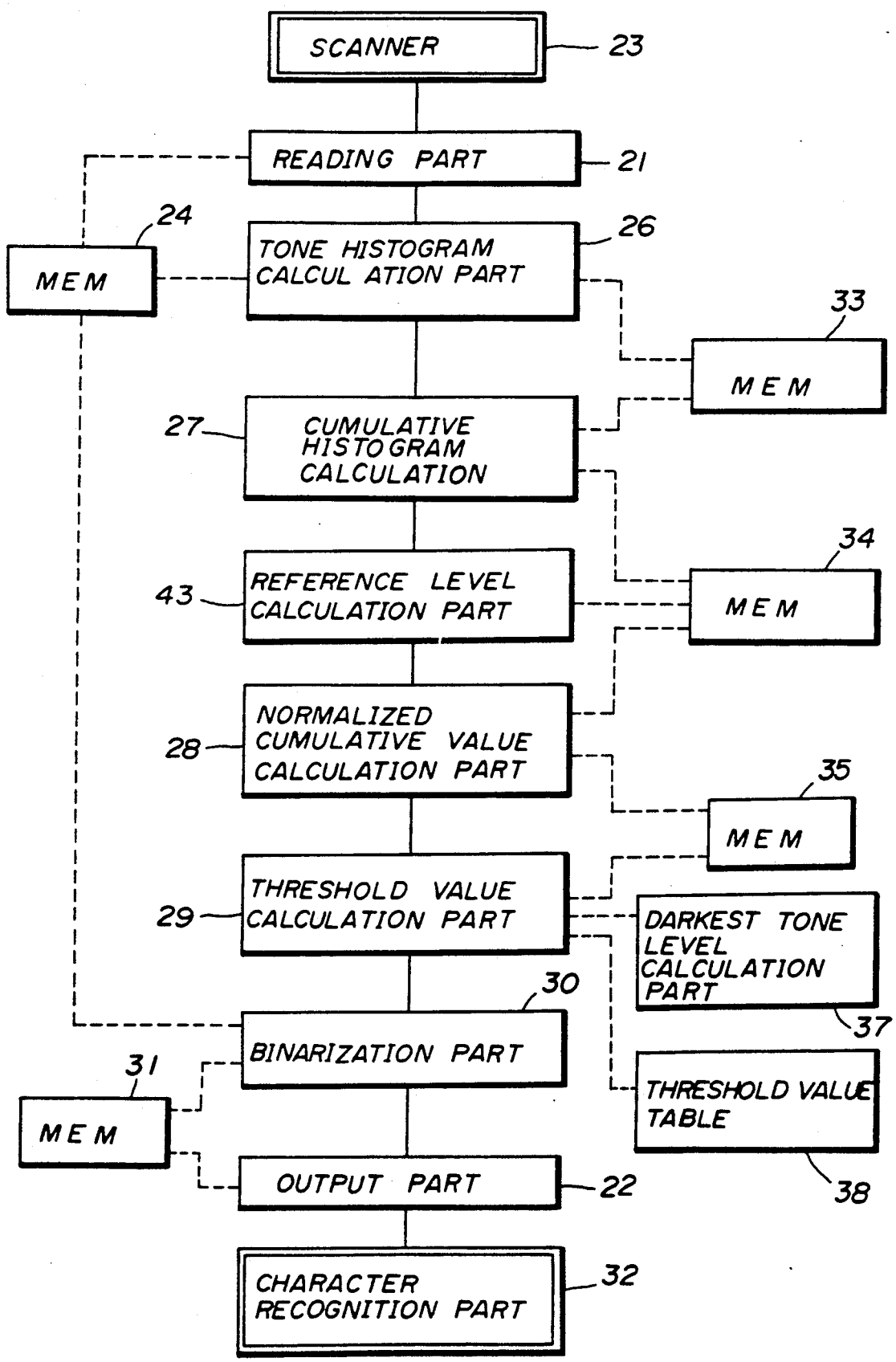
FIG. 25 is a system block diagram showing an image processing system to which an eleventh embodiment of the binarization method according to the present invention is applied.
Figure 26:
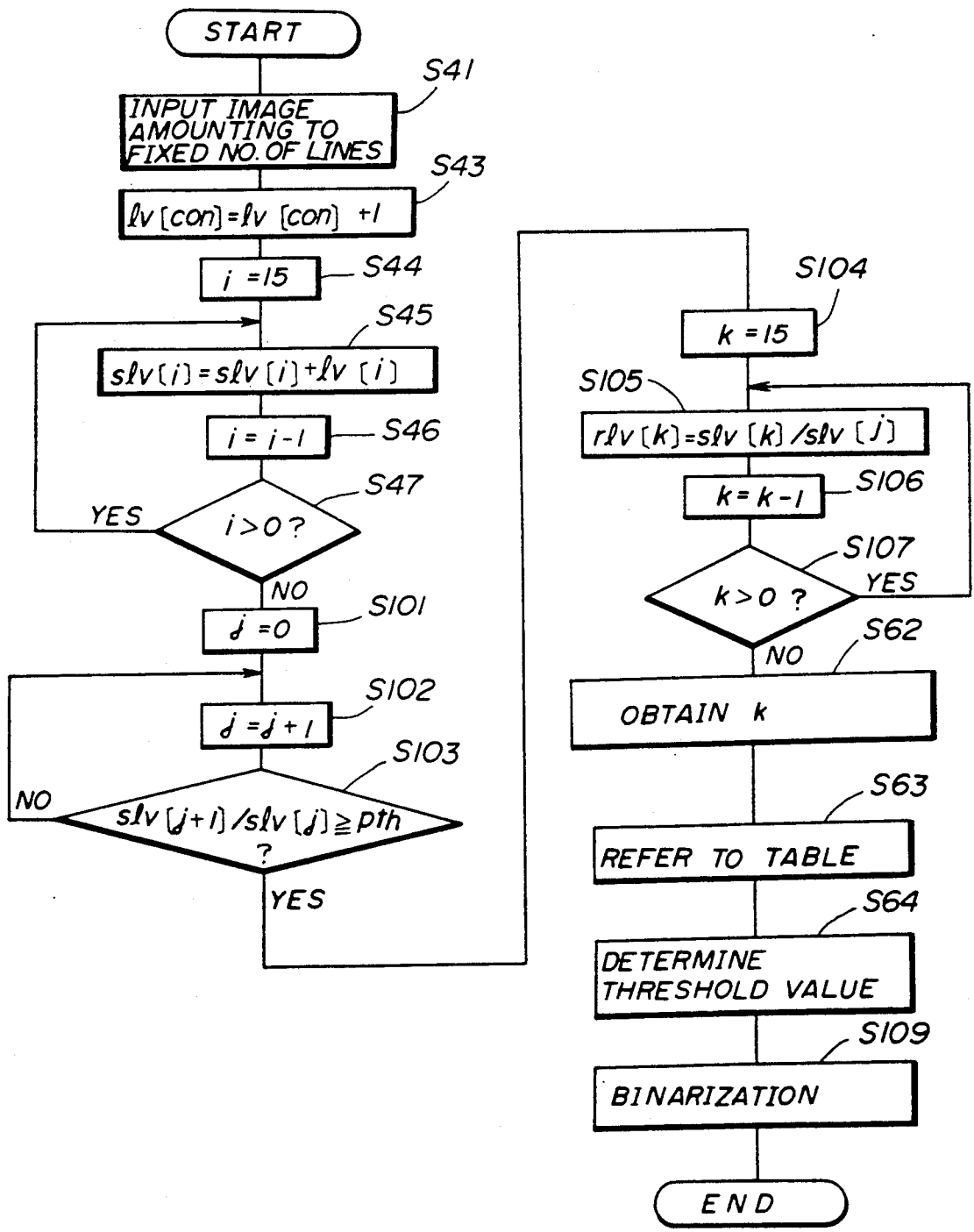
FIG. 26 is a flow chart showing an operation of the block system shown in FIG. 25 for explaining an operation of the eleventh embodiment.

Next, a description will be given of an eleventh embodiment of the binarization method according to the present invention, by referring to FIGS. 25 and 26. FIG. 25 shows an image processing system to which the eleventh embodiment is applied, and FIG. 26 shows a flow chart showing an operation of the block system shown in FIG. 25 for explaining an operation of the eleventh embodiment. In FIGS. 25 and 26, those parts which are essentially the same as those corresponding parts in FIGS. 23 and 24 are designated by the same reference numerals, and a description thereof will be omitted.

As may be seen by comparing FIGS. 25 and 23, the image processing system shown in FIG. 25 is essentially the same as that shown in FIG. 23 except that the part for determining the threshold value is modified similarly to the fifth embodiment.

In the flow chart shown in FIG. 26, the process only differs from that shown in FIG. 24 in that the threshold value is determined similarly to the fifth embodiment. In FIG. 26, the same designations as used as in FIG. 13.

Figure 27:
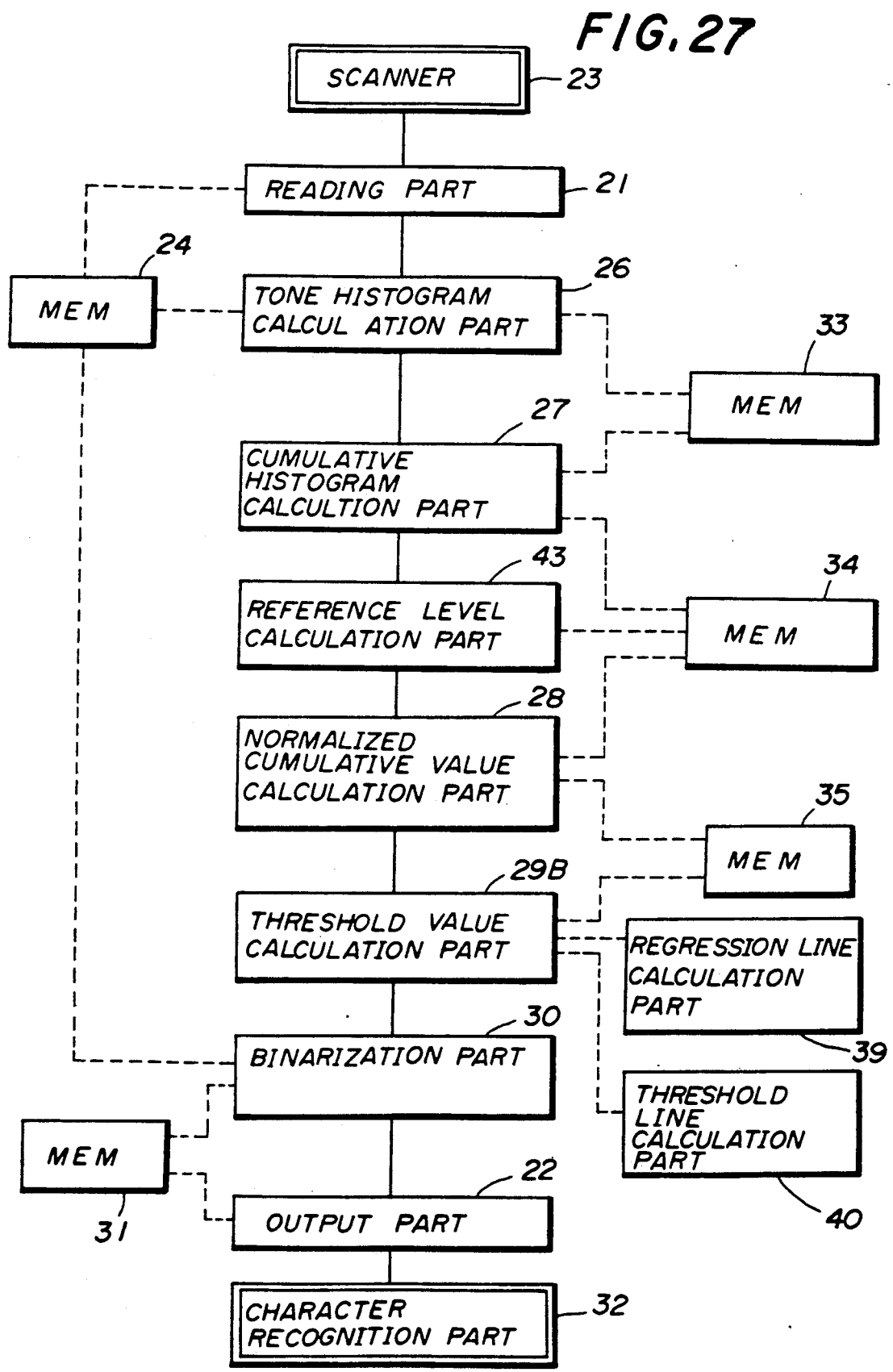
FIG. 27 is a system block diagram showing an image processing system to which a twelfth embodiment of the binarization method according to the present invention is applied.

Next, a description will be given of a twelfth embodiment of the binarization method according to the present invention, by referring to FIGS. 27 and 28. FIG. 27 shows an image processing system to which the twelfth embodiment is applied, and FIG. 28 shows a flow chart showing an operation of the block system shown in FIG. 27 for explaining an operation of the twelfth embodiment. In FIGS. 27 and 28, those parts which are essentially the same as those corresponding parts in FIGS. 23 and 24 are designated by the same reference numerals, and a description thereof will be omitted.

As may be seen by comparing FIGS. 27 and 23, the image processing system shown in FIG. 27 is essentially the same a that shown in FIG. 23 except that the part for determining the threshold value is modified similarly to the sixth embodiment.

In the flow chart shown in FIG. 28, the process only differs from that shown in FIG. 24 in that the threshold value is determined similarly to the sixth embodiment. In FIG. 28, the same designations as used as in FIG. 15.

Other combinations of the described embodiments are possible. For example, in each of the first, second, third, tenth, eleventh and twelfth embodiments, it is possible to directly input the black-and-white bi-level image data from the scanner similarly to the seventh, eighth and ninth embodiments. In addition, in each of the first through ninth embodiments, it is possible to determine the reference tone level for the normalization similarly to the tenth, eleventh and twelfth embodiments.

Further, the present invention is not limited to these embodiments, but various variations and modifications may be made without departing from the scope of the present invention.

What is claimed is:

1. A binarization method of obtaining an optimum threshold value for binarization which is used when converting a multi-level image data which describes an input image into a black-and-white bi-level image data, said binarization method comprising the steps of:
   obtaining cumulative values of histograms for each tone level from a darkest tone level to a predetermined tone level which is the second lightest tone level, each of said histograms being a number of picture elements having a corresponding one of the tone levels other that the lightest tone level;
   obtaining percentages of the cumulative values of histograms for each of the tone levels darker than the predetermined tone level with respect to the cumulative value of histograms for the predetermined tone level, so as to normalize the cumulative values of histograms for each of the tone levels darker than the predetermined tone level; and
   determining the optimum threshold value for binarization based on the percentages which are obtained for each of the tone levels.

2. The binarization method as claimed in claim 1 wherein said step of determining the optimum threshold value detects an arbitrary tone level at which the picture elements have the darkest tone level and obtains the optimum threshold based on said arbitrary tone level.

3. The binarization method as claimed in claim 1 wherein said step of determining the optimum threshold value includes:
   detecting a tone of the input image based on a rate of change of the percentages which are obtained for each of the tone levels; and
   obtaining the optimum threshold value based on said rate of change.

4. The binarization method as claimed in claim 1 which further comprises the step of obtaining the black-and-white bi-level image data by carrying out a binarization using said optimum threshold value which is determined by said step of determining the optimum threshold value.

5. The binarization method as claimed in claim 1 which further comprises the steps of setting said optimum threshold value which is determined by said step of determining the optimum threshold value in a scanner which scans the input image, and obtaining the black-and-white bi-level image data directly from an output of the scanner.

6. A binarization method of obtaining an optimum threshold value for binarization which is used when converting a multi-level image data which describes an input image into a black-and-white bi-level image data, said binarization method comprising the steps of:
   dividing the input image into a plurality of regions;
   obtaining cumulative values of histograms within each region for each of tone levels from a darkest tone level to a predetermined tone level which is the second lightest tone level, each of said histograms being a number of picture elements having a corresponding one of the tone levels other than the lightest tone level;
   obtaining percentages of the cumulative values of histograms within each region for each of the tone levels darker than the predetermined tone level with respect to the cumulative value of histograms for the predetermined tone level, so as to normalize the cumulative values of histograms for each of the tone levels darker than the predetermined tone level; and
   determining the optimum threshold value for binarization with respect to each region based on the percentages which are obtained for each of the tone levels.

7. The binarization method as claimed in claim 6 wherein said step of determining the optimum threshold value detects an arbitrary tone level at which the picture elements have the darkest tone level within each region and obtains the optimum threshold value with respect to each region based on said arbitrary tone level.

8. The binarization method as claimed in claim 6 wherein said step of determining the optimum threshold value includes:
   detecting a tone of the input image within each region based on a rate of change of the percentages which are obtained for each of the tone levels; and
   obtaining the optimum threshold value with respect to each region based on said rate of change.

9. The binarization method as claimed in claim 6 which further comprises the step of obtaining the black-and-white bi-level image data by carrying out a binarization with respect to each region using said optimum threshold value which is determined by said step of determining the optimum threshold value.

10. The binarization method as claimed in claim 6 which further comprises the steps of setting said optimum threshold value which is determined for each region by said step of determining the optimum threshold value in a scanner which scans the input image, and obtaining the black-and-white bi-level image data directly from an output of the scanner.

11. The binarization method as claimed in claim 1 wherein said step obtaining cumulative values of histograms includes:
   obtaining the histograms respectively related to the number of picture elements having one of the tone levels other than the lightest tone levels; and
   obtaining the cumulative values of the histograms.

12. The binarization method as claimed in claim 1 wherein said step of determining the optimum threshold value includes:
   obtaining an arbitrary normalized cumulative value of histograms which most closely approximates a preset normalized cumulative value of the histograms; and
   determining a tone level corresponding to the arbitrary normalized cumulative value of histograms as the optimum threshold value.

13. The binarization method as claimed in claim 1 wherein said step of determining the optimum threshold value includes:
   detecting an arbitrary tone level at which the picture elements have the darkest tone level; and
   determining the optimum threshold value by referring to a table which contains a relationship between tone levels and corresponding optimum threshold value using the detected arbitrary tone level.

14. The binarization method as claimed in claim 1 wherein said step of determining the optimum threshold value includes:
   detecting a rate of change of the percentages; and
   determining the optimum threshold value by referring to a table which contains a relationship between rates of change and corresponding optimum threshold values using the detected rate of change.

15. The binarization method as claimed in claim 6 wherein said step of obtaining cumulative values of histograms includes:
   obtaining within each region the histograms respectively related to the number of picture elements having one of the tone levels other than the lightest tone levels; and
   obtaining the cumulative value of the histograms within each region.

16. The binarization method as claimed in claim 6 wherein said step of determining the optimum threshold value includes:
   obtaining an arbitrary normalized cumulative value of histograms within each region which most closely approximates a preset normalized cumulative value of the histograms; and
   determining a tone level corresponding to the arbitrary normalized cumulative value of histograms as the optimum threshold value within each region.

17. The binarization method as claimed in claim 6 wherein said step of determining the optimum threshold value includes:
   detecting an arbitrary tone level at which the picture elements have the darkest tone level within each region; and
   determining the optimum threshold value within each region by referring to a table which contains a relationship between tone levels and corresponding optimum threshold values using the detected arbitrary tone level.

18. The binarization method as claimed in claim 6 wherein said step of determining the optimum threshold value includes:
   detecting a rate of change of the percentages within each region; and
   determining the optimum threshold value within each region by referring to a table which contains a relationship between rates of change and corresponding optimum threshold values using the detected rate of change.

* * * * *